(12) United States Patent
Kisiel

(10) Patent No.: US 6,327,586 B1
(45) Date of Patent: Dec. 4, 2001

(54) SYSTEM METHOD AND COMPUTER PROGRAM PRODUCT TO AUTOMATE THE MANAGEMENT AND ANALYSIS OF HETEROGENEOUS DATA

(75) Inventor: Kenneth W. Kisiel, Columbia, MD (US)

(73) Assignee: WisdomBuilder, L.L.C., Columbia, MD (US)

( * ) Notice: Subject to any disclaimer, the term of this patent is extended or adjusted under 35 U.S.C. 154(b) by 0 days.

(21) Appl. No.: 09/085,055

(22) Filed: May 27, 1998

(51) Int. Cl.⁷ .................................................. G06F 17/30

(52) U.S. Cl. ...................... 707/2; 707/3; 707/4; 707/500; 707/526; 707/532; 345/326; 345/340; 345/348

(58) Field of Search ................................... 707/1, 2, 3, 4, 707/500, 526, 532; 345/326, 340, 348

(56) References Cited

U.S. PATENT DOCUMENTS

| | | | | |
|---|---|---|---|---|
| 5,202,828 | * | 4/1993 | Vertelney et al. | 707/530 |
| 5,237,651 | * | 8/1993 | Randall | 345/350 |
| 5,283,864 | * | 2/1994 | Knowlton | 345/350 |
| 5,367,623 | * | 11/1994 | Iwai et al. | 345/350 |
| 5,392,387 | * | 2/1995 | Fitzpatrick et al. | 370/311 |
| 5,506,951 | * | 4/1996 | Ishikawa | 345/341 |
| 5,526,480 | * | 6/1996 | Gibson | 345/302 |
| 5,528,259 | * | 6/1996 | Bates et al. | 345/121 |
| 5,666,964 | * | 9/1997 | Helsel et al. | 364/350 |
| 5,668,964 | * | 9/1997 | Helsel et al. | 345/350 |
| 5,710,897 | * | 1/1998 | Schneider | 345/334 |
| 5,838,973 | * | 11/1998 | Carpenter-Smith et al. | 395/701 |
| 5,987,474 | * | 11/1999 | Sandifer | 707/104 |

\* cited by examiner

Primary Examiner—John Breene
Assistant Examiner—Cheryl Lewis
(74) Attorney, Agent, or Firm—Sterne, Kessler, Goldstein & Fox P.L.L.C.

(57) ABSTRACT

System, Method and Computer Program Product for automating the collection, management and analysis of data. Research is performed according to a methodology based on four phases: Requirements; Collection; Analysis; and Reporting. During the Requirements phase, users records objectives for the research project and items of interest in a Personal Dictionary. The items of interest are organized according to user defined or pre-defined categories. Data entered by the user during the Requirements phase is also used to automatically conduct database searches to compile information for the research project. During the Collection phase relevant data items are filtered and stored in a repository. Data files are automatically searched for items of interest from the Personal Dictionary. Automation tools are provided so users can quickly and efficiently determine the relevancy of documents based on the defined items of interest. Interactive visual displays are provided that model the contents of documents according to items of interest, so that the users can efficiently and quickly scan large volumes of information to determine their relevancy. During the Analysis phase data is analyzed, compared, related, visualized, and understood in terms of the items of interest. Relationships between data items are recorded and automatically maintained. Knowledge is added to the data items in terms of written comments and relationships between items. Relationship diagrams are provided that graphically depict relationships between any two items of interest. The relationship diagrams display relationships according to degrees of separation. Users are instantly presented with direct and distant relationships between items of interest. During the Dissemination phase users create reports that are automatically sent to other users. Documents and other data files are bookmarked during the Analysis phase so that they are instantly retrievable during the Dissemination phase and included in the final report.

45 Claims, 18 Drawing Sheets

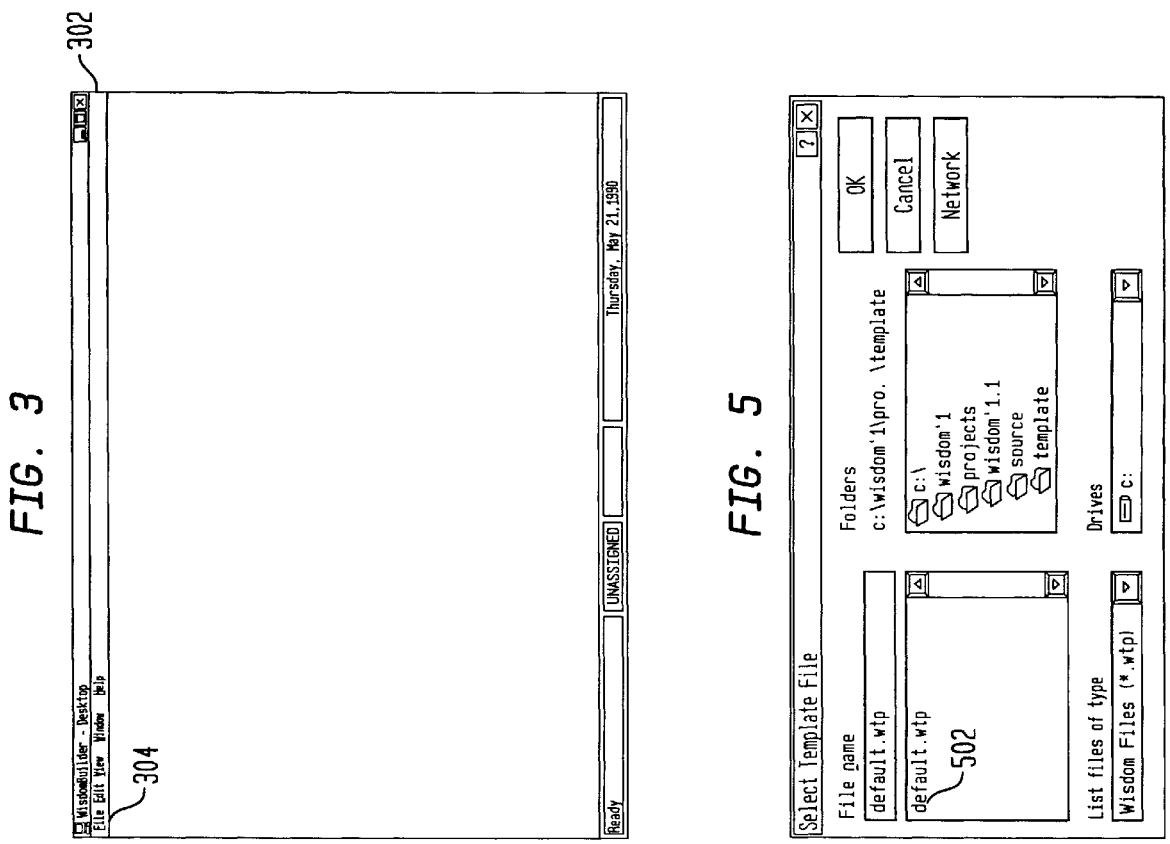
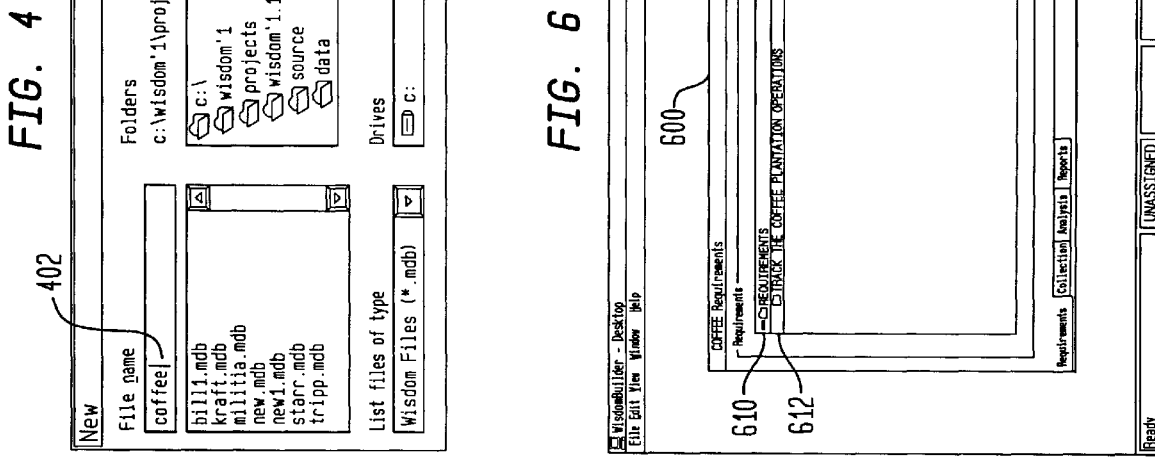

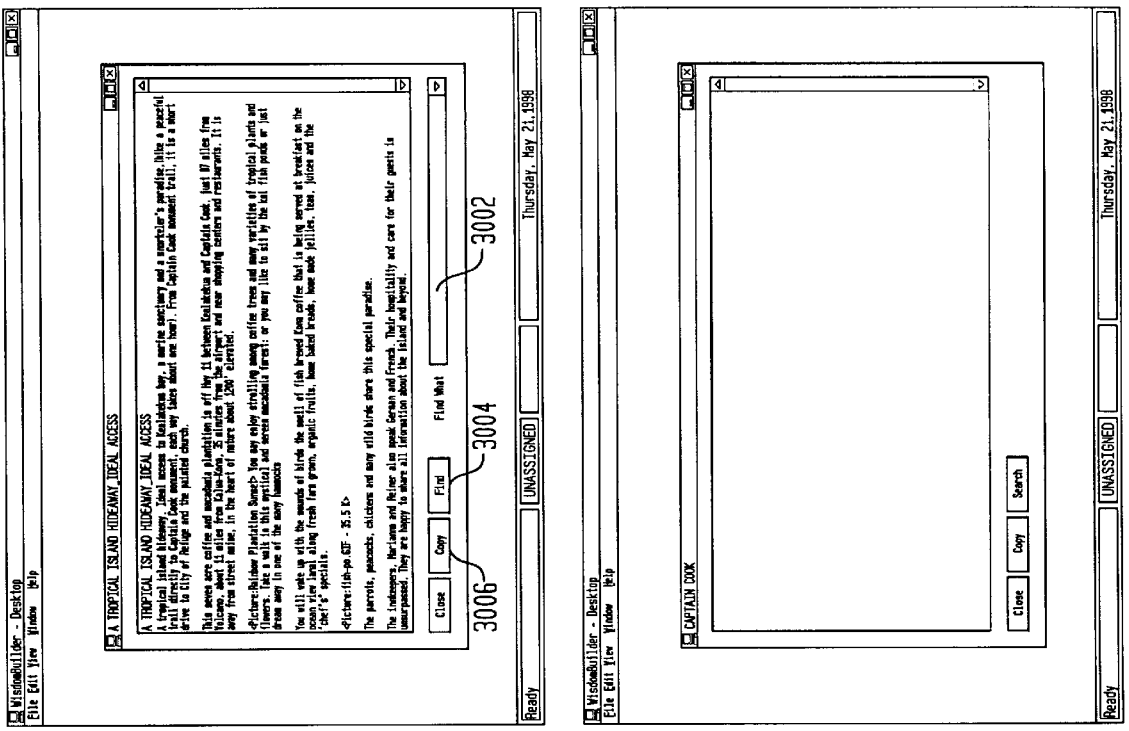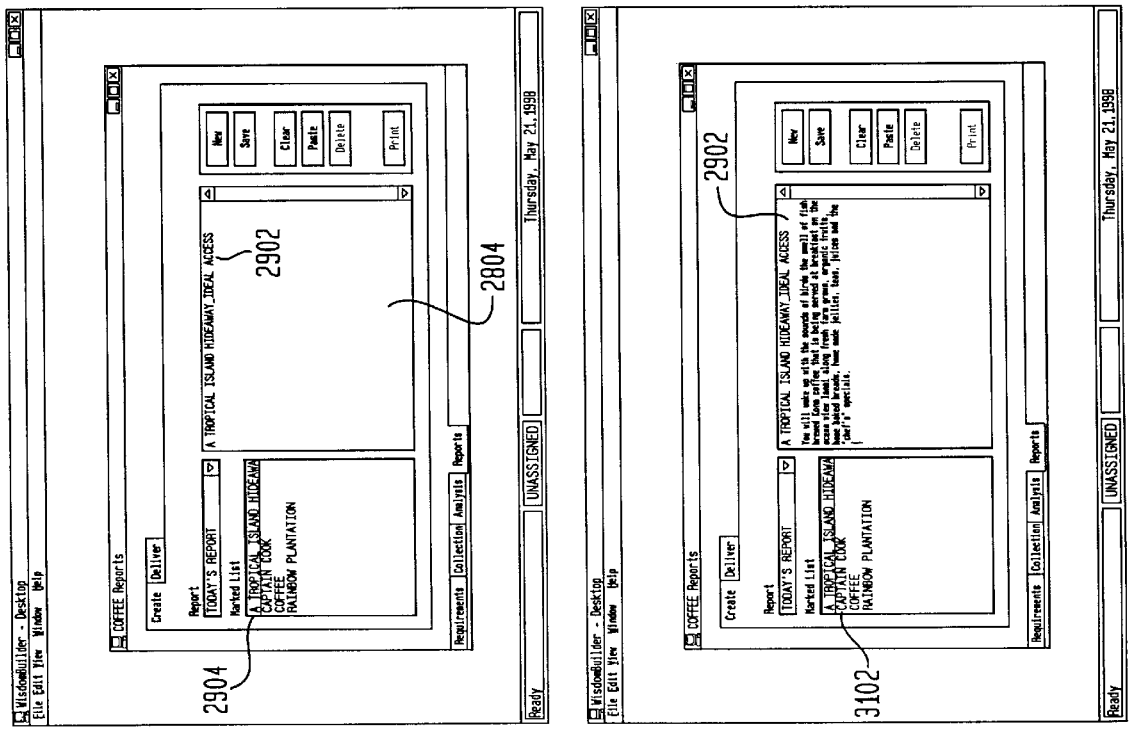

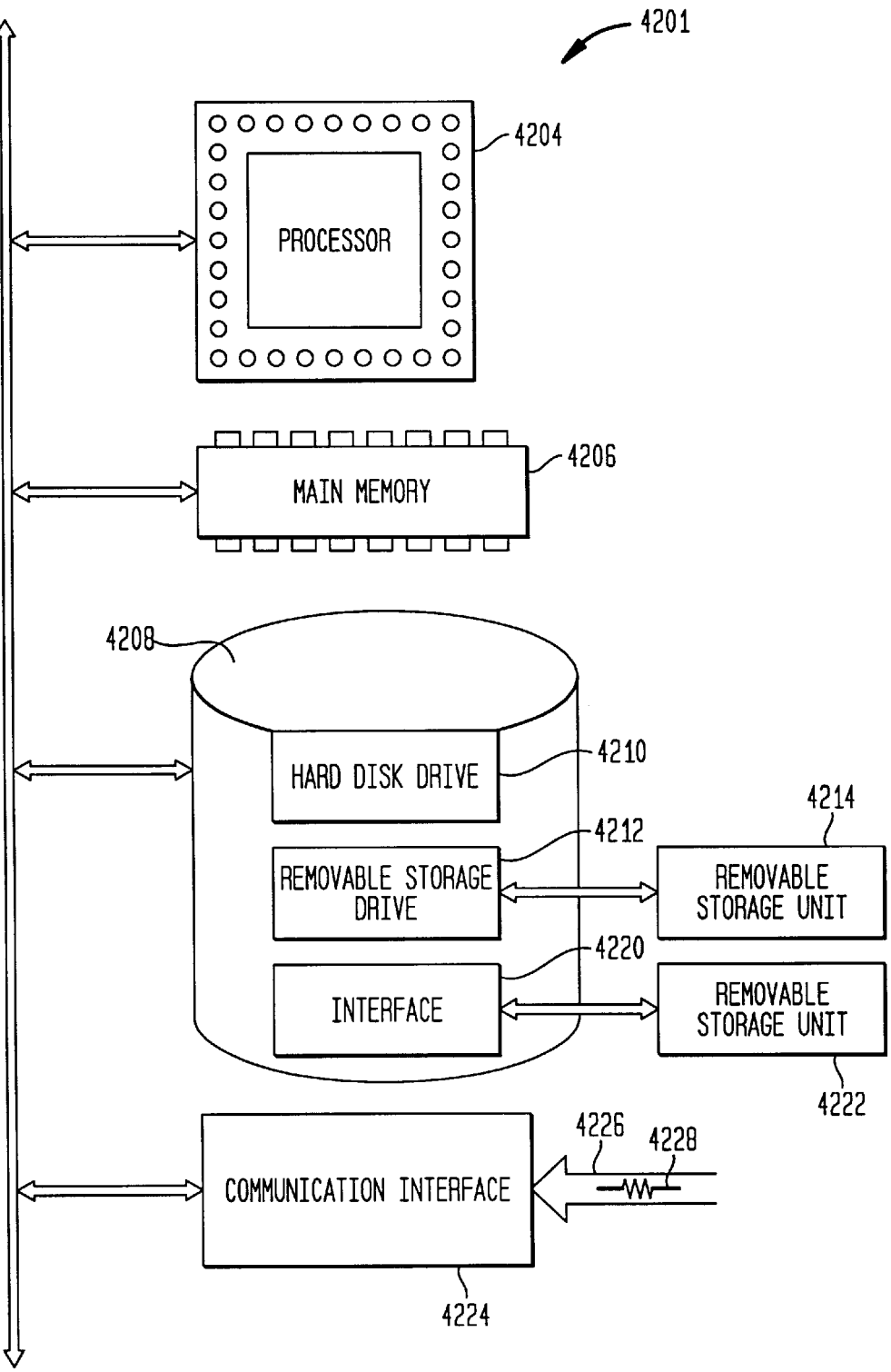

SYSTEM METHOD AND COMPUTER PROGRAM PRODUCT TO AUTOMATE THE MANAGEMENT AND ANALYSIS OF HETEROGENEOUS DATA

BACKGROUND OF THE INVENTION

1. Field of the Invention

The present invention relates generally to data analysis, and specifically to a system, method and computer program product for automating the collection and analysis of data. More specifically, the present invention provides an automated tool for defining research requirements, collecting, managing and analyzing data, building relationships between data items, and for generating reports based on data from a variety of sources.

2. Related art

We live in an era of data overload where information continues to grow at an ever-spiraling rate. This presents a real challenge in doing effective research and analysis of data. Data analysts quickly become overwhelmed by the glut of raw data and consequently often miss securing critical information.

Currently, there are relatively few tools to assist the analyst in managing this information overload. Typically, these tools consist of stand-alone or independent tools that have been designed to serve a single purpose. Examples of such tools are: word processors; spreadsheets; search engines and browsers; database management systems; and data visualization systems.

A major problem with these stand-alone tools is that the analyst is forced to manually manipulate the data between the use of each tool. Additionally, using the conventional method, the analyst is required to have a thorough understanding of Boolean logic and a database query language, such as Standard Query Language (SQL), to gain access to the stored data. It has been estimated that using these conventional methods, analysts can spend up to ninety percent of their time searching, collecting, and organizing information. This leaves a mere five to ten percent of an analyst's time for performing actual analysis of data.

Accordingly, what is needed is an automated system and method for defining, collecting, organizing and analyzing data.

SUMMARY OF THE INVENTION

Accordingly, the present invention provides a complete end-to-end data management and analysis tool based on four phases of the intelligence process used to perform research on data. The present invention increases research efficiency by providing automated data analysis that allows analysts to spend more time on data analysis and less time on data management.

The present invention accomplishes this by providing a single environment where users can perform knowledge management and knowledge production of data. The knowledge management feature of the present invention allows users to quickly and efficiently cull through large quantities of data, so that items that are of interest, quickly and efficiently emerge to the surface. Once the items of interest are determined, only those data items associated with the items of interest are saved in a repository. These items are saved in the repository along with related tags so that users can leverage off their associative style of thinking and work more efficiently at retrieving data. The knowledge production features of the present invention allow users not only to extract patterns from the data but also to visualize the data so that new patterns and relationships can easily be recorded.

Specifically, the present invention provides a unique set of automation tools to assist the user in conducting research. This is accomplished using a methodology based on four phases for conducting research, namely, the Requirements phase, the Collection phase, the Analysis phase and the Reporting phase.

The Requirements phase is where the user records the objectives for the research project. The requirements may be referred to by the user at any time during the remaining research phases to serve as a focal point for the collection and interpretation of data. In addition, the requirements entered by the user can be used to automatically perform database searches to compile data for the research project.

During the Requirements phase, users define items of interest in a Personal Dictionary. The items of interest are organized by user-defined or pre-defined categories.

The Collection phase is used to filter out relevant data items from irrelevant data. The relevant data is stored in a repository. The present invention provides the user with a set of automation tools to assist in the collection process. Specifically, the present invention automatically searches for the items of interest and associated aliases stored in the Personal Dictionary. In addition, automation tools are provided that allow the user to quickly and efficiently determine the relevancy of documents based on the occurrences of the items of interest. This is accomplished in part, by providing the user with interactive visualization displays that model document contents according to the defined items of interest.

Accordingly, the present invention provides an efficient means for quickly scanning large volumes of information to determine their relevancy with respect to the current research project. The items that are determined to be relevant are automatically saved into a repository associated with the research project. These items are tagged with descriptive user created pointers to facilitate future retrieval of those items.

The Analysis phase is where the collected information from the Collection phase is analyzed, compared, related, and understood in terms of the items of interest from the Personal Dictionary. During the Analysis phase, the analyst reviews the collected items and extracts patterns and relationships. Relationships between data items are recorded and automatically maintained by the present invention. In addition, knowledge is added to any item or relationship between items by written comments that are automatically associated with the corresponding data items and maintained by the present invention.

During the Analysis phase, the present invention provides the user with relationship diagrams that graphically depict the relationships between any two items of interest. These relationship diagrams are selectable by the user in terms of their "degree of separation". That is, the present invention provides a mechanism that allows users to display direct relationships between two items of interest, as well as indirect, distant relationships. In this fashion, users are instantly presented with distant relationships between items of interest that may never have been known to exist.

The Dissemination or Reporting phase is used to assist the analyst in creating reports of a research project. Specifically, summaries and conclusions are captured to be included in the finished reports. Documents are "bookmarked" during the Analysis phase so that they are can be instantly retrieved and included in the final report(s). During the Reporting phase, analysts document their analyses, conclusions and recommendations.

BRIEF DESCRIPTION OF THE FIGURES

The present invention is described with reference to the accompanying drawings, wherein:

FIGS. 3–35 are representations of display screens, windows and dialog boxes that can be used in to implement a preferred embodiment of the present invention;

FIG. 42 is a block diagram of a computer useful for implementing components of the present invention.

DETAILED DESCRIPTION OF THE PREFERRED EMBODIMENTS

The present invention is directed toward an automated system and method for defining research requirements, collecting data, analyzing data, visualizing data, building relationships between data items, and generating reports based on data from a variety of sources.

The present invention can be implemented in software on a general purpose computer system. An example of a general purpose computer system is presented and described below with reference to FIG. 42. In a preferred embodiment, the present invention runs on an operating system with a graphical user interface, such as Windows 95®, Windows 98® or Windows NT® manufactured by Microsoft Corporation®. The example embodiment of the present invention is preferably implemented using a high level language, such as Visual Basic®, manufactured by Microsoft Corporation. Visual Basic is especially useful to implement the present invention due to its built-in database management capabilities, that are useful for implementing the database management features of the present invention.

Note that the programming language, the operating system and the database management system used to implement a preferred embodiment of the present invention, are listed herein for exemplary purposes only. In other embodiments, different operating systems can be used to implement the present invention. Such operating systems include, but are not limited to, various flavors of the UNIX operating system, Macintosh operating systems, Lynx, OS/2, MVS, VM/CMS and the like.

Similarly, other high level languages may be used in various embodiments of the present invention. Such languages include, but are not limited to, C, C++, Java, COBOL, Pascal and the like. In addition, other database management systems, such as Oracle, Sybase, Access, Progress and the like, can be used to implement the database management features in alternate embodiments of the present invention. Accordingly, the example used herein should not be construed to limit the scope and breadth of the present invention.

Figure 1:
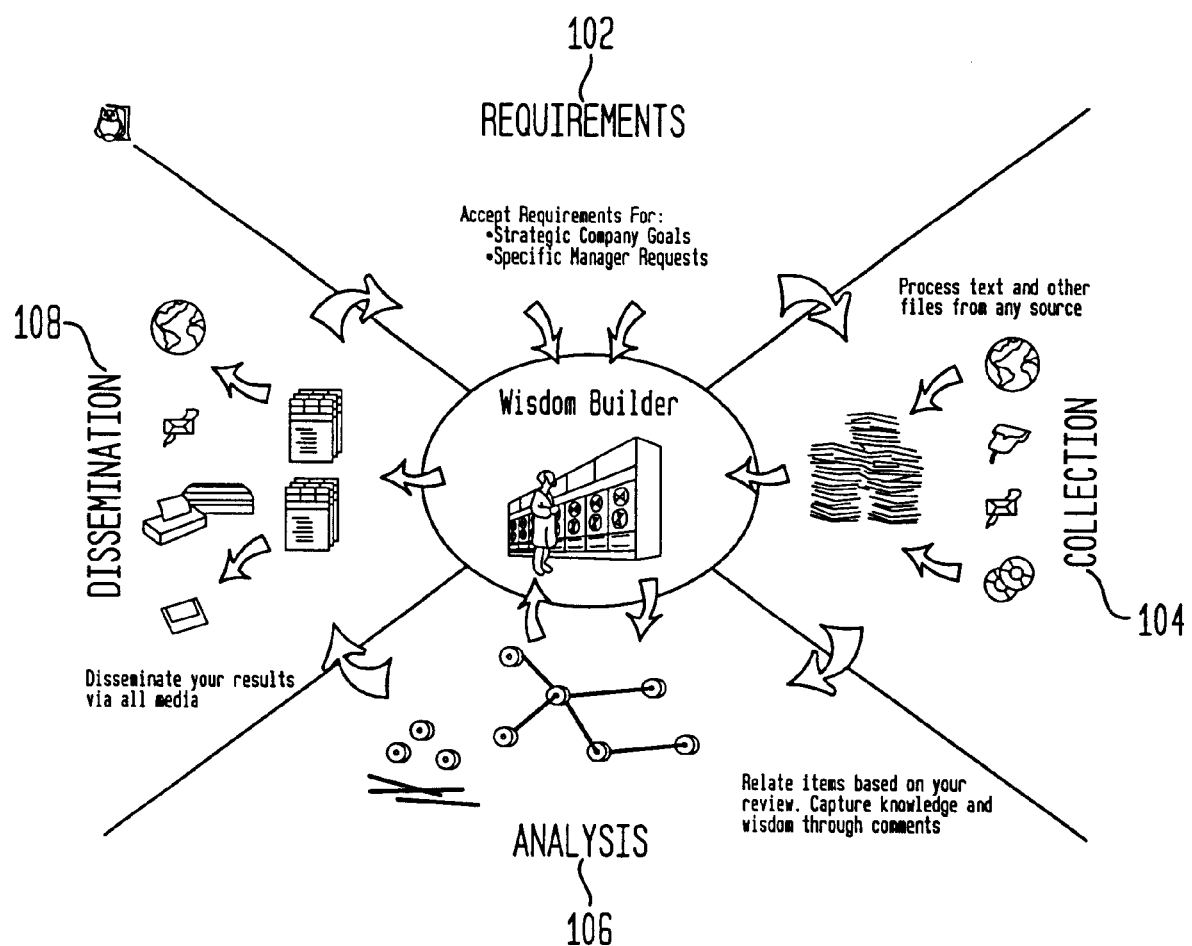
FIG. 1 depicts an overview of the analysis process, according to a preferred embodiment of the present invention.

FIG. 1 depicts an overview of the analysis process, according to a preferred embodiment of the present invention. This methodology is based on a standard approach for conducting research, namely, collecting, analyzing, and reporting information. Specifically, the analysis process of the present invention comprises four phases referred to herein as; the Requirements phase 102; the Collection phase 104; the Analysis phase 106; and the Dissemination phase 108.

The Requirements phase 102 is used to capture and document initial questions to be answered, or issues to be followed, during a particular research project. The Requirements phase 102 documents requirements that are the focal point for the collection and the interpretation of information. For example, as shown in FIG. 1, the Requirements phase 102 accepts requirements from a user (also referred to herein as "analyst" and/or "researcher"), such as strategic company goals and specific manager requests. These requirements allow the analyst to focus during the Collection phase 104 and to determine how events are interpreted during the Analysis phase 106. As described below, the Requirements phase 102 can also be used to define requirements for an automated search provided by an embodiment of the present invention.

The Collection phase 104 directs the searching of internal and external data sources and filters them to extract relevant information therefrom, according to the recorded requirements entered during the Requirements phase 102. Once information is retrieved, the analyst typically reviews the collected information to ensure that the retrieved items contain relevant pieces of information.

The retrieved items that are determined to be relevant, are automatically saved into a repository associated with the research project. The items that are saved in the repository are tagged with descriptive user created pointers to facilitate future retrieval of those items.

As shown by the example in FIG. 1, the Collection phase 104 processes text and other files from a variety of sources. These sources include the Internet, other databases, scanners, word processors, news services, research services and the like. The files used with the present invention can be in any format including text, audio, video, and graphic file formats.

It should be noted that according to one embodiment of the present invention, the text and other files are manually compiled by the user and stored on their computer system. Typically this is accomplished using one or more external tools such as scanners, word processors, Internet browsers, Internet search engines and the like. After these files are compiled and stored on the user's computer system, the present invention filters them during the Collection phase 104, by separating relevant data from irrelevant data.

In another embodiment, the present invention provides a means to compile data for the user based on the requirements entered during the Requirements phase 102. Once the requirements are entered, typically in a natural language format, the present invention communicates with one or more external or internal data sources, such as the Internet, database files, files in the users directories, etc. Once these results are compiled they are used in the Collection phase 102 and filtered for relevant data items, as described above.

The Analysis phase 106 is where the collected information from the Collection phase 104 is analyzed, compared, related, visualized, and understood in terms of the requirements entered during the Requirements phase 102. During the Analysis phase 106, the analyst typically reviews the collected items and extracts patterns and relationships therefrom. In this fashion, the analyst creates meaning to the data items as they relate back to the requirements entered during the Requirements phase 102. Relationships between data items are recorded for later analysis and/or insertion into a final report.

As indicated by FIG. 1, users can also add knowledge to any data item by adding written comments. These comments are automatically associated with the corresponding data items and are automatically maintained by the present invention.

The Dissemination or Reporting phase 108 is used to assist the analyst in creating reports of a research project. Specifically, summaries and conclusions are captured to be included in the finished reports. During the Reporting phase 108, analysts document their analyses, conclusions, and recommendations.

Figure 2:
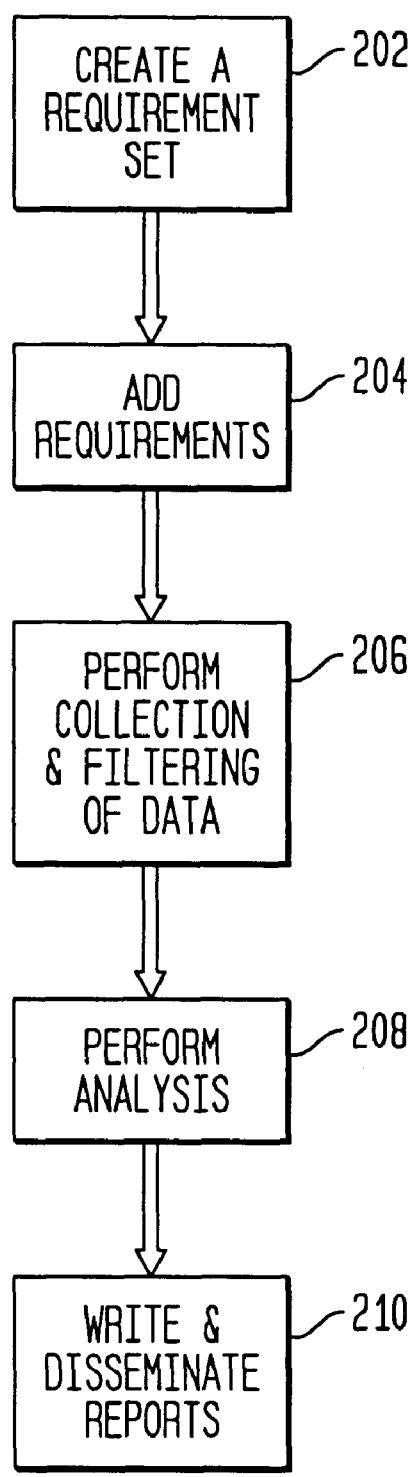
FIG. 2 is a flowchart depicting the overall process that can be used to manage and analyze data, according to a preferred embodiment of the present invention.

FIG. 2 is a flowchart depicting the overall process that can be used to define requirements, collect, manage and analyze data, according to a preferred embodiment of the present invention. The process begins with step 202, where a user creates a requirement set that defines the basis for the research being conducted. Next, in step 204, requirements are added to the requirement set created in step 204. This step continues until all of the requirements have been added into the requirement set.

Next, as step 206 indicates, the collection and filtering of data are performed. As described below, the present invention provides several valuable tools that assist the user during the Collection phase 104 so that large quantities of data can be quickly and efficiently compiled, viewed and filtered according to the user specified requirements from steps 202 and 204.

Next, as step 208 indicates, data analysis is performed. As described below, the present invention provides several valuable tools to assist the user in finding relationships between data items so that the Analysis phase 106 is performed efficiently.

Finally, the process ends with step 210, where the user writes and disseminates reports. Again, the present invention provides the user with valuable tools that assist the user in quickly and efficiently retrieving the relevant information to include in a report, without having to re-read all of the collected data items.

Each of these activities is described in detail below. FIGS. 3–35 are representations of display screens, windows and dialog boxes that can be used in a preferred embodiment of the present invention. These representations are used for exemplary purposes only to describe the features and functions of the present invention, which can be implemented in a variety of ways that are different from examples presented herein. As such, these examples should not be construed to limit the scope and breadth of the present invention. Furthermore, programming code to implement the features and functions described herein with reference to FIGS. 3–35 would be apparent to persons skilled in the relevant art(s), after reading the present disclosure.

Creating a Requirement Set

Referring now to FIG. 3, a requirement set is created by the user. This can be accomplished by selecting the File/New option 304 from the menu bar 302. When this occurs, a new requirement set dialog box is presented, as shown by FIG. 4. Next, the user enters a name for the new requirement set, such as "Coffee" 402.

Following the naming of the new requirement 402, the user is given the opportunity to select the requirement set template, as shown in FIG. 5. In this example, the requirement set template is named "default.wtp" 502. This a default template that preferably contains default or pre-defined categories that can be used by the user. Examples of such default categories include: People; Places; Organizations; Products; and Events.

At this point, the present invention creates a database structure (described below) for the requirement set. When this is completed, the requirement set interface is presented to the user, as shown in FIG. 6.

Accordingly, using the requirement set interface 600, users can add 602, edit 604 and delete 606 one or more requirements, such as the requirements 610. In addition, by clicking on the Print List push-button 608, users can print the entire list of requirements.

Adding Requirements

Figure 7:
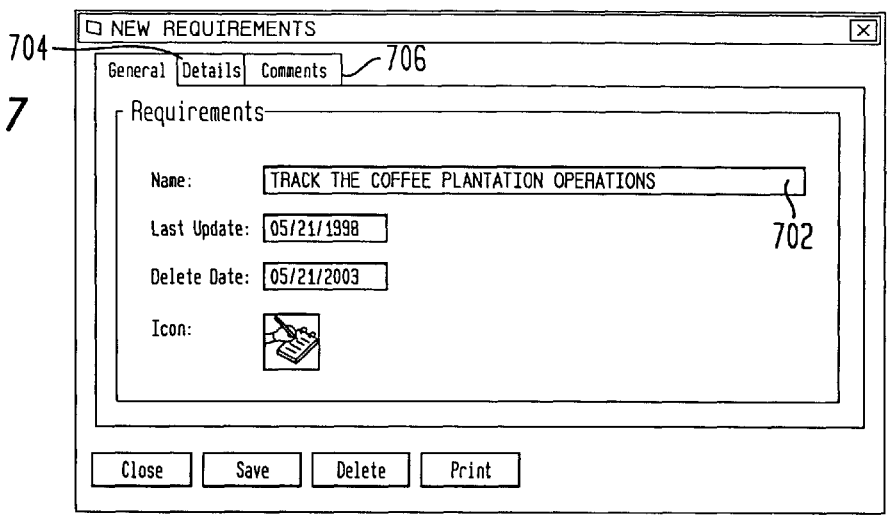

Once a requirement set has been created, requirements can be added to the requirement set 610. Preferably, this is accomplished by selecting the requirement set 610 and then clicking the Add push button 602. This action causes the computer to display a new requirements dialog box 700, as shown in FIG. 7. This dialog box 700 is used to accept from the user, information about the requirement.

For example the user can give the requirement a name 702. In addition the user can specify the requester, set status and priority, and record the owner of the requirement. These options are typically available through the details tab 704. Additionally the user can record any thoughts, ideas, or comments using the comments tab 706. Note that the requirement 702 is listed in the requirement set interface 600 at 612.

Preferably, requirements can also have sub-requirements. These can be created by selecting the desired parent requirement, such as 612, and then clicking the Add button 602. Note that information pertaining to requirements can preferably be modified at any time by selecting the requirement 610 and by clicking on the Edit button 602.

Collection & Filtering of Data

After the requirements have been recorded, using the above method, the user can begin collecting information pertaining to the requirement 610. As stated above, one embodiment of the present invention assists the user in data compilation. In this embodiment, the requirement data entered by the user during the Requirements phase 102, is used to initiate a search on one or more external data sources, such as the Internet, database files, or files in the users directories. The interface provided by the present invention preferably allows the user a enter plain text description of the requirement, for example, in the details 704 section of the requirements dialog box 700. The present invention then extracts the concepts from the plain text description and initiates a search based on those concepts.

Preferably, data items that match the concepts from the requirements are presented back to the user. At this point the user typically reviews the returned items, keeping only the relevant ones, and discarding the others. In addition, the user can select portions of a single item (or multiple items), and request a new search based on the newly selected items. In essence, the user asks the present invention to find additional items that are similar to the selected items (i.e. the user asks the system to "show more items like this"). In this fashion, the user is presented with highly relevant information in a quick and efficient manner. After all data has been compiled, the saved data items are used in the Collection phase 102, where they are filtered according to their relevancy.

In another embodiment of the present invention, the user uses external tools such as Internet search engines, browsers, word processors, scanners, and the like to compile data that is to be used as a basis for the research project. Of course, this form of data compilation can be combined with the automated form of data compilation provided by the present invention, as described above.

In any case, once the data is compiled and stored on the user's computer system, using one or both techniques described above, the Collection phase 104 continues with a two-step process. First the user selects the files for review. Once the files have been selected, the user manually reviews the files, with the assistance of the provided tools (described below), and saves the files that have been determined to be relevant. In a preferred embodiment, the files are saved in a repository associated with the research project.

As stated, a preferred embodiment of the present invention accepts information from any data source in any format. This includes text, graphics, audio, video, etc. Such file types include, but are not limited to, ASCII, various word processing data files, HTML, VRML, JPEG, MPEG, WAV, MID, BMP, TIF and the like.

Figure 8:
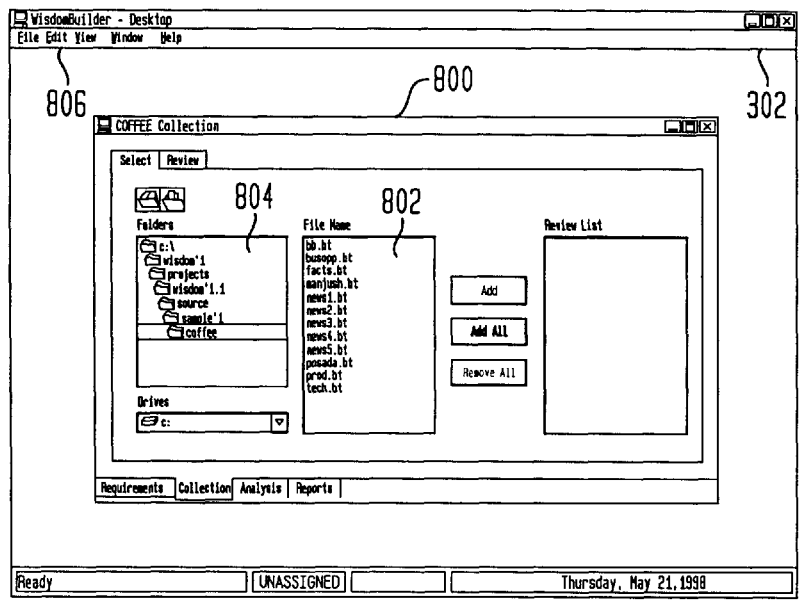

Referring now to FIG. 8, a collection window 804 provides an interface to the folders that contain information stored on the users computer system. As stated, these files have been compiled by the user either manually, or with the searching capabilities of the present invention. In this example, a directory window 804, and a files window 802, allow the user to traverse the storage device to find data items that are to be reviewed for the current research project.

Figure 9:
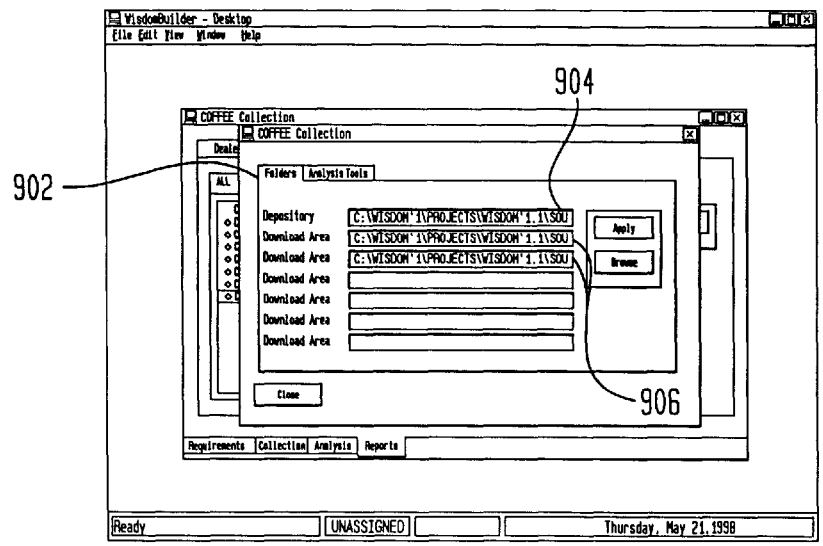

These windows 802 and 804 preferably contain standard drive and folder navigation objects. In addition the present invention preferably provides shortcut buttons that the user can select to take them directly to a predefined folder. These predefined folders are defined using the View/Preference option (see 806) from the main menu bar 302. This action displays the Preference window 900 as shown in FIG. 9. In this example, the user selects the folders tab 902 and specifies a default directory for the repository 904 and download directories 906. The repository directory is used to store the data collected during the Collection phase 104, that is determined to be relevant to the current research project, based on the recorded requirements. The download directory or directories 906 is where the compiled data is stored.

Figure 10:
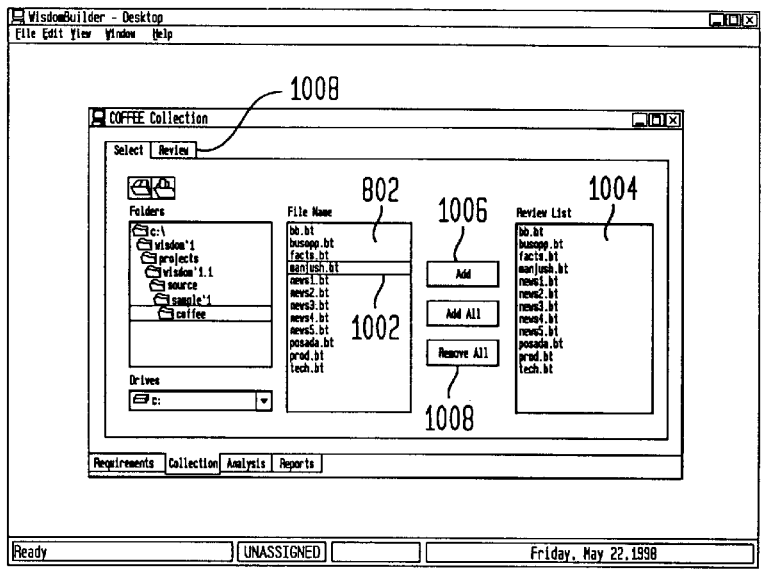

Referring now to FIG. 10, users can navigate through the folders and files (using the windows 804 and 802, respectively) to select one or more files for review. Files can be selected in the files window 802. For example, one file 1002 is depicted as being selected. One or more selected files can be moved to the review list 1004 by clicking the Add button 1006. Alternatively, users can also preferably accomplish this task simply by dragging a selected file, such as 1002 from the files window 802, and dropping it onto the review list 1004. Files can also be removed from the review list by clicking the Remove All button 1008.

Figure 11:
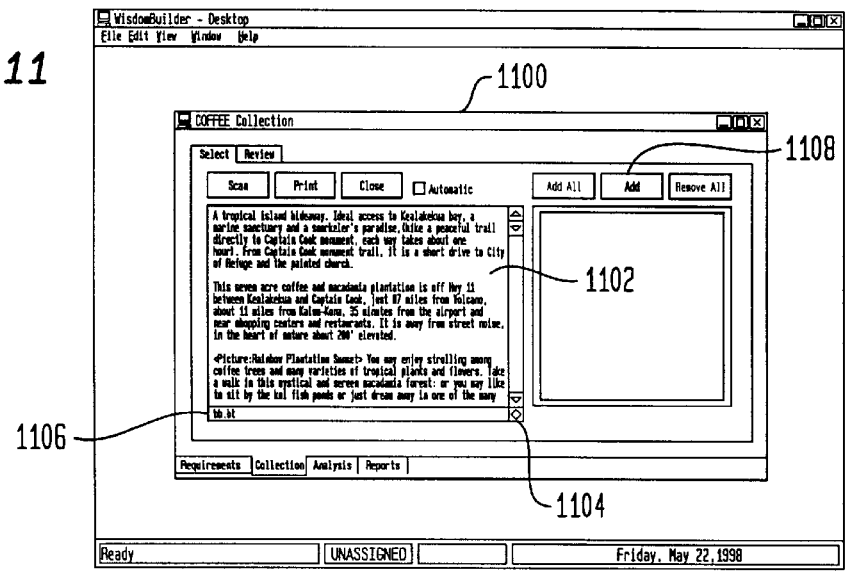

In a preferred embodiment, files in the review list 1004 are reviewed by clicking on the review tab 1008. When this occurs a review screen is displayed. An example of a review screen is shown in FIG. 11. From the review screen 1100, the user can review the full text of any file listed in the review list 1004. The full text is displayed in the text window 1102. The name of the current file being viewed is shown in the field 1106. To view another file, the scroll button 1104 is used.

Thus, the user can read the displayed text in the text window 1102, to determine if it contains any items of interest pertaining to the research project. However, if the user has multiple documents to review, this method can be very tedious and time-consuming. For example, if a user is required to view hundreds of documents on a daily basis, it may be not be possible to actually read all of the documents in this fashion.

Accordingly, the present invention provides an efficient means for quickly scanning large volumes of information to determine their relevancy with respect to the current research project. Specifically, the present invention provides an automated means to determine whether or not, one or more "items of interest" are contained therein. Items of interest are defined by the user in a Personal Dictionary, according to a preferred embodiment of the present invention.

Figure 12:
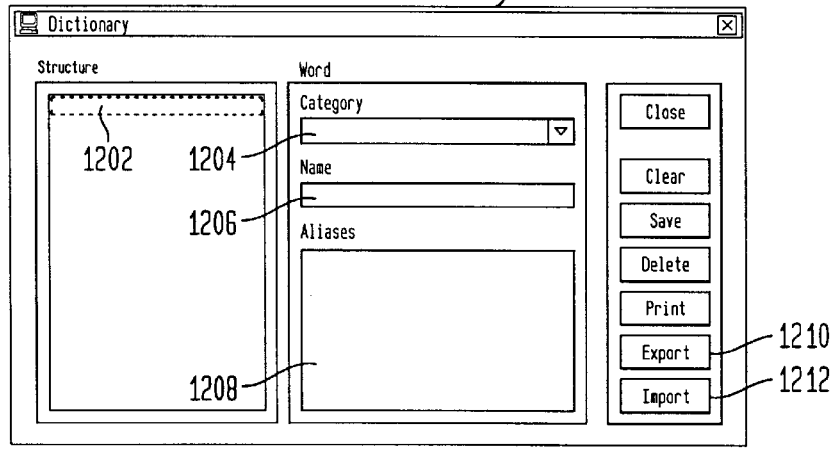
Figure 13:
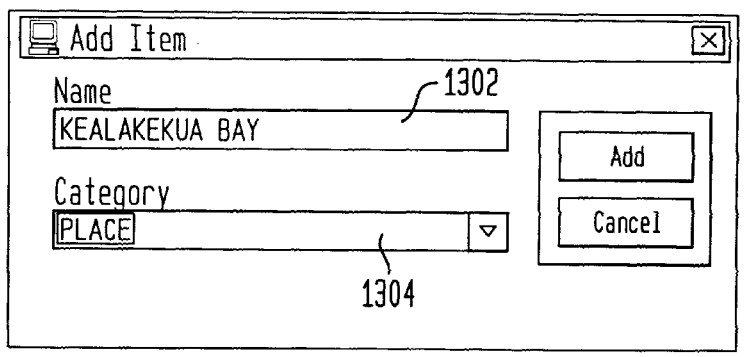

FIG. 12 depicts a display screen that can be used to specify items of interest for a Personal Dictionary according to preferred embodiment of the present invention. In this example, the display windows 1202, 1204 and 1206 are empty because data for the Personal Dictionary has not yet been specified by a user.

Accordingly, the Structure window 1202 is used to display the structure of the Personal Dictionary. The Structure is typically comprised of one or more categories, followed by one or more items of interest that falls within each category.

The Category window 1204 is used to display the category of the currently selected item of interest. Categories are defined by users. Alternatively, users can make use of pre-defined categories provided by the present invention. Examples of such predefined categories include: People; Places; Organizations; Products; and Events. This window 1204 can be pulled down to display a list of all categories defined. The name window 1206 is used to display the name of the currently selected Personal Dictionary. Finally, the aliases window is used to display the aliases defined for the currently selected item of interest.

Thus, the Personal Dictionary allows the user to record, by category, the names of those items that they are interested in tracking. The item names are used to define a criteria for scanning the files. That is, the files are searched for the occurrences of the defined items of interest in the Personal Dictionary.

In addition, the user can record one or more aliases 1208 for each item of interest. The aliases are recognized in the text files and are treated as being equivalent to the associated item of interest by the present invention. For example, "District of Columbia" may be a defined alias for "Washington D.C." Accordingly, if both terms are found in a single document, for example, the present invention reports that two occurrences of the defined item of interest "Washington D.C." are contained in the document. In this fashion, items of interest are recognized in the documents even though they are not referred to by their formal title.

Preferably, Personal Dictionaries can be shared through the import and export feature of the present invention (see 1210 and 1212). Items can be entered into the Personal Dictionary directly from the Personal Dictionary screen 1200, by manually selecting a category in 1204, entering a name in 1206, and providing any aliases in 1208.

In addition, the present invention provides a convenient way to add items of interest to the Personal Dictionary while reviewing text in the text window 1102. This is accomplished by highlighting any word in the text window 1102 and clicking the Add button 1108 (see FIG. 11). When this occurs the user is presented with add item window shown in FIG. 13, so that the user can add a new category or select a category from the Category pull-down 1304. The name of the newly added item of interest is automatically displayed in the Name field 1302, where it can be edited if necessary.

Figure 14:
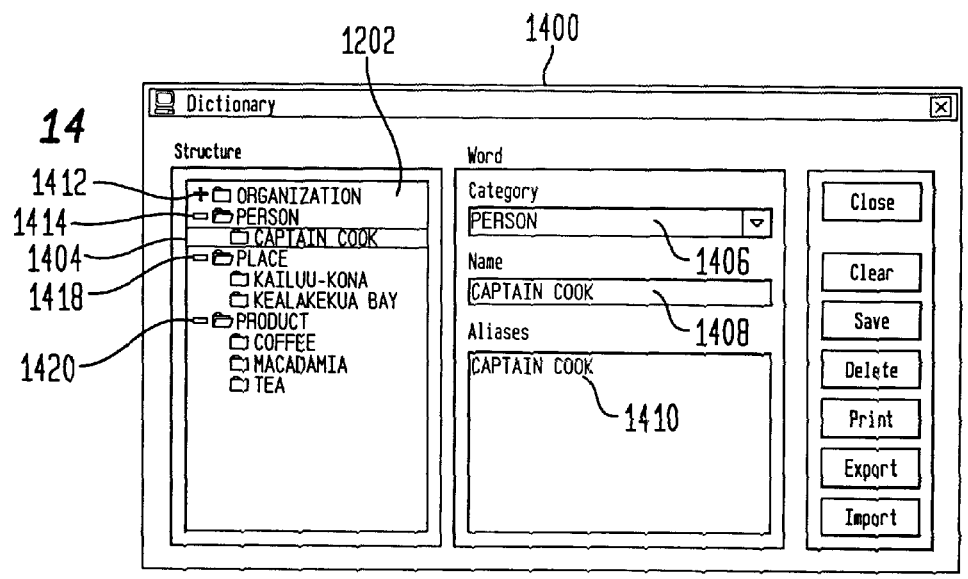

FIG. 14 shows a display of a Personal Dictionary. In this example, four categories have been defined, namely: Organization 1412; Person 1414; Place 1418; and Product 1420. Note that the Category window 1406, the Name window 1408 and the Aliases window 1410 are each associated with the particular item of interest that is highlighted (i.e. selected) in the Structure window 1202. In this example the item of interest named "CAPTAIN COOK" 1404 is selected.

Once a Personal Dictionary has been created, the user can now request that the present invention automatically review the document. This is accomplished by scanning the content of text document for the occurrence(s) of items of interest and/or associated aliases.

Figure 15:
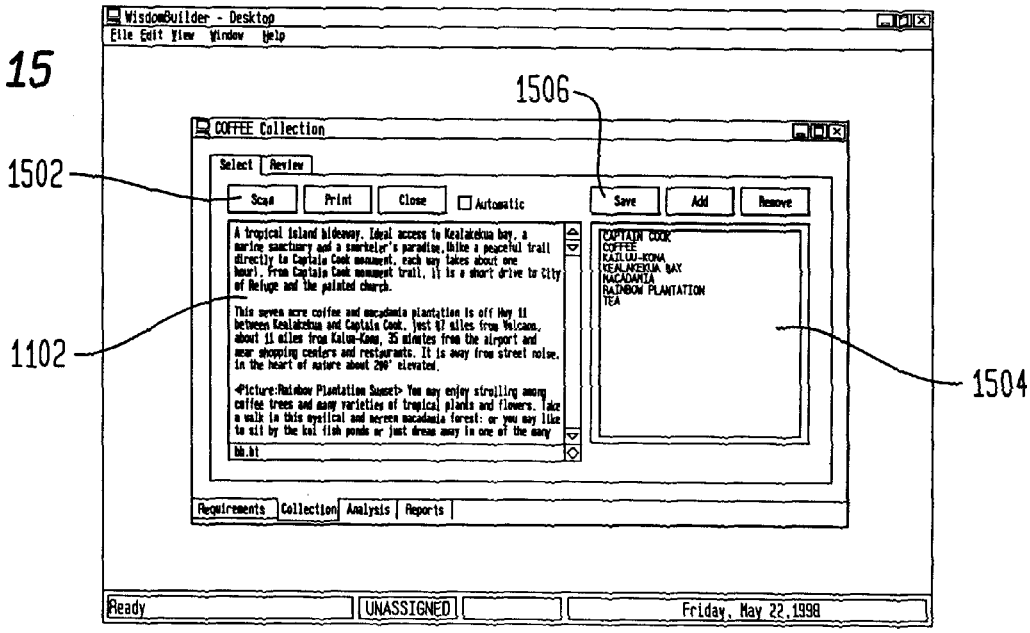

Referring now to FIG. 15, a review screen, similar to that presented in FIG. 11 is depicted. In this example the user directs the present invention to automatically scan the document being reviewed in the text window 1102 by pressing the Scan button 1502. In response to this request, the present invention scans the document for all items and their respective aliases, as defined in the Personal Dictionary 1400. The results of the scan is presented in the display window 1504. That is, the display window 1504 displays a list of each item of interest found in the document. Further, in a preferred embodiment, when users select an item of interest in the display window 1504, the corresponding words are highlighted in the text window 1102.

Figure 16:
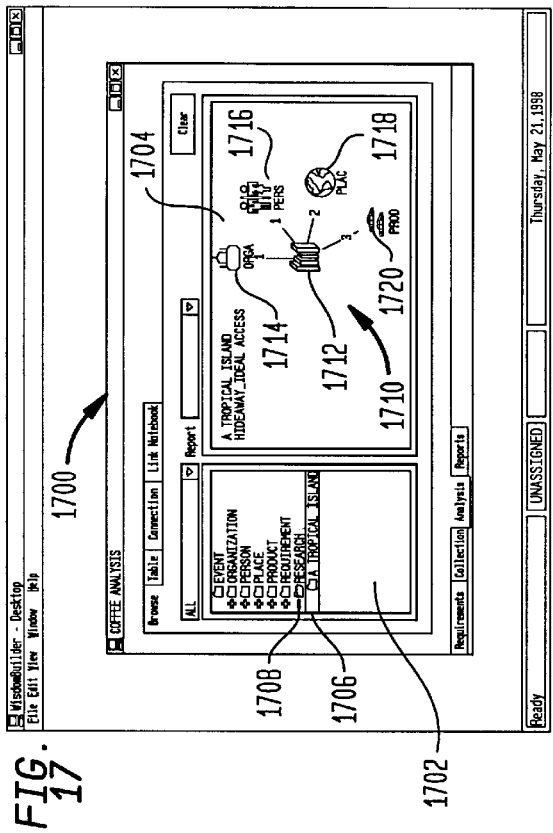
Figure 17:
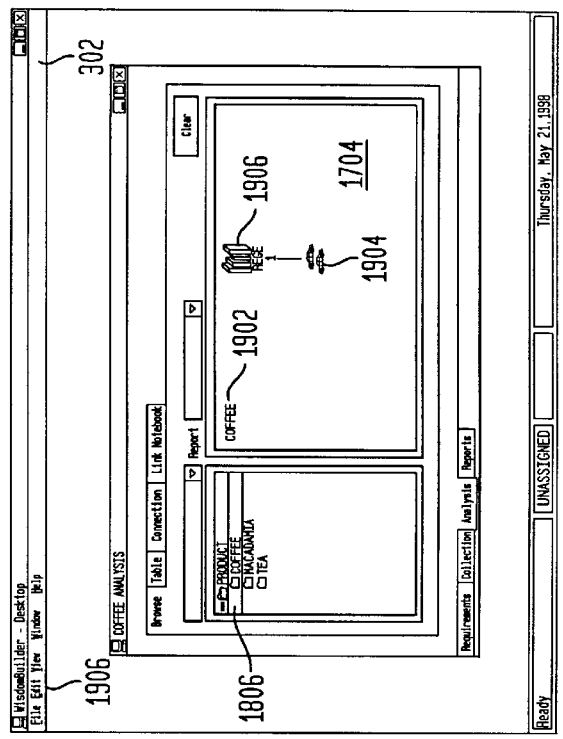

After a document has been scanned in this fashion, and items of interest have been found, the document is typically deemed to be relevant by the user, and is manually saved in a repository associated with the current research project. This is accomplished by clicking this Save button 1506. Next, as shown by FIG. 16, the user enters a title for the research item in 1602. At this point, the present invention saves the document and the associated items of interest found therein 1504, as an associated link. This is accomplished by maintaining the associations in a database table. An example of database tables that can be used to implement the present invention is described below.

Analysis

The analysis task typically begins with the user reviewing the research documents that have been deemed relevant and saved into the repository as described above. These documents are preferably analyzed from the Analysis/Browse window 1700, shown in FIG. 17. In this example, a document 1706 is listed under the "RESEARCH" category 1708. To begin analysis of the document 1706, the user selects the desired document 1706 and drags it into the right hand display area 1704.

When this occurs, the present invention displays a visual representation 1710 depicting information about the contents of the document 1706, to assist the user in analysis. Specifically, the visual representation 1710 provides the researcher with a means to instantly comprehend the relevancy of the document 1706. This is accomplished by displaying which categories of items of interest are contained within the document 1706. In addition, the visual representation 1710 displays the number of occurrences of items of interest within each category.

In this example, the visual representation 1710 comprises a document icon 1712, representing the document 1706 being analyzed. The document icon 1712 is surrounded by four category icons 1714–1720, each representing a particular category of items of interest found within the document 1706. In this example, the categories are: Organization 1714; Person 1716; Place 1718; and Product 1720.

The number of items of interest contained in the document 1706, that are within each category is displayed on the connecting line between the document icon 1710 and the corresponding category icon 1714–1720. Accordingly, in this example, the researcher instantly comprehends that the document 1706 contains: one item of interest in the Organization category 1714; one item of interest in the Person category 1716; two items of interest in the Place category 1718; and three items of interest in the Product category 1720.

Thus, the visual representation 1710 provided by the present invention is a quick and efficient means to rank the relevancy of the document 1706, without having to read a single word in the document.

Note that the particular items of interest within each category are not depicted in the visual representation 1710. However, the present invention provides a means for the user to instantly review the particular items of interest associated with any of the categories 1714–1720, by interacting directly with the visual representation 1710. This is accomplished by dragging any of the category icons 1714–1720 from the display window 1704, to the item list area 1702.

Figure 18:
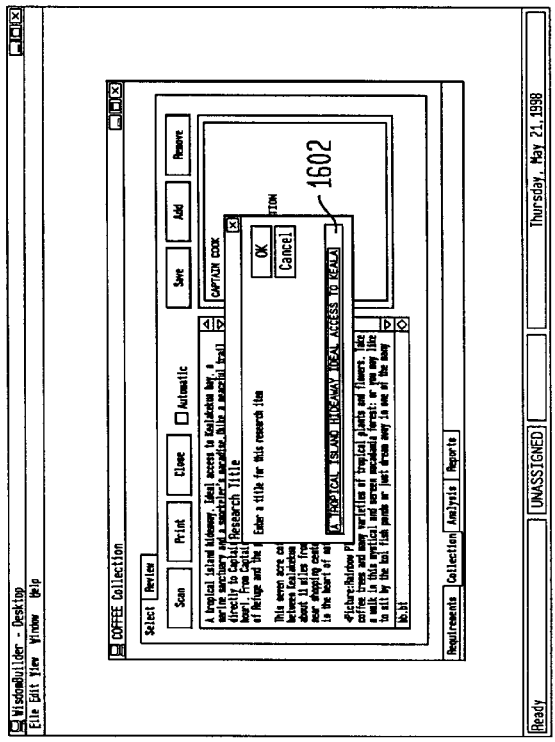

This feature of the present invention is depicted in FIG. 18. In particular, FIG. 18 shows the results of a user dragging the "PRODUCT" icon 1720 into the list item area 1702. Note that in a preferred embodiment, the background color of the item list area 1702 is changed to indicate that relationship data is now being viewed.

Thus, in this example, the list item area 1702 now displays the particular items of interest in the "PRODUCT" category found within the document 1702. In particular, the items of interest found contained in the document are"COFFEE" 1806, "MACADAMIA" 1808 and "TEA" 1810. Note that the title of the document 1802 is also displayed in the display area 1704.

Further, items from the item list area 1702 can now be dragged back into the display area 1704. In this fashion, users can obtain additional visual information about the item of interest in a quick and efficient manner by interacting directly with the visual displays.

Thus, the present invention provides a means for users to navigate the entire repository and gain valuable knowledge about the relevancy of documents and the relationships between documents and items of interest, in an extremely fast and efficient manner. Note that this is accomplished without requiring the user to read a single document. In addition, this is accomplished without requiring the user to know anything about database management, SQL queries or the like. In this fashion, users can concentrate on the data being analyzed and not waste time being distracted by traditional data management techniques, such as database queries and the like.

Figure 19:
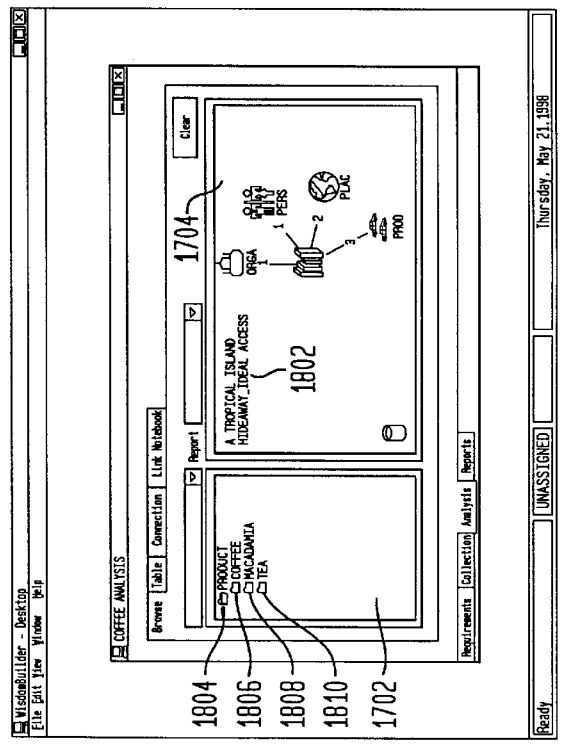

For example, FIG. 19 shows the results of a user dragging the "COFFEE" 1806 item of interest into the display area 1704. When this is performed, the display area 1704 now shows the items related to "COFFEE" 1902. In this example, the item of interest "COFFEE" is represented by the icon 1904. The related items "RESEARCH" is represented by the icon 1906.

Figure 20:
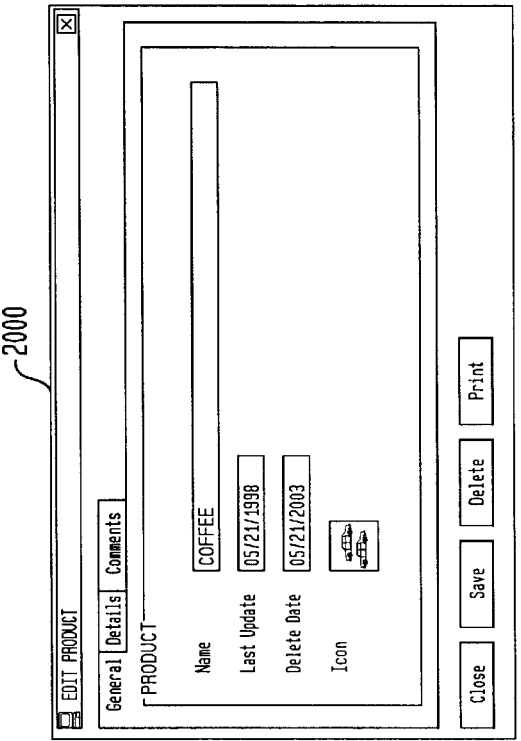

Note that in a preferred embodiment, detailed information about any item can be obtained at any time by double clicking on the icon representing the item, such as item 1904. This can also be accomplished by selecting the item 1806 in the item list area 1702 and selecting the View/Profile option 1906 from the menu bar 302. When this occurs, a dialog box, such as the one depicted in FIG. 20 is displayed. From the dialog box in FIG. 20, the user can view information for that item and if desired, modify that information.

The focus of the Analysis phase 106 is to provide the user with advanced data analysis tools that allow the user to obtain new and unique information about the data being analyzed by the various views of the data provided herein. In this fashion, users can easily record patterns and relationships found during the analysis process.

Relationship links are preferably created when an item is dragged from the item list area 1702 and dropped on the central item in the display area 1704.

Figure 21:
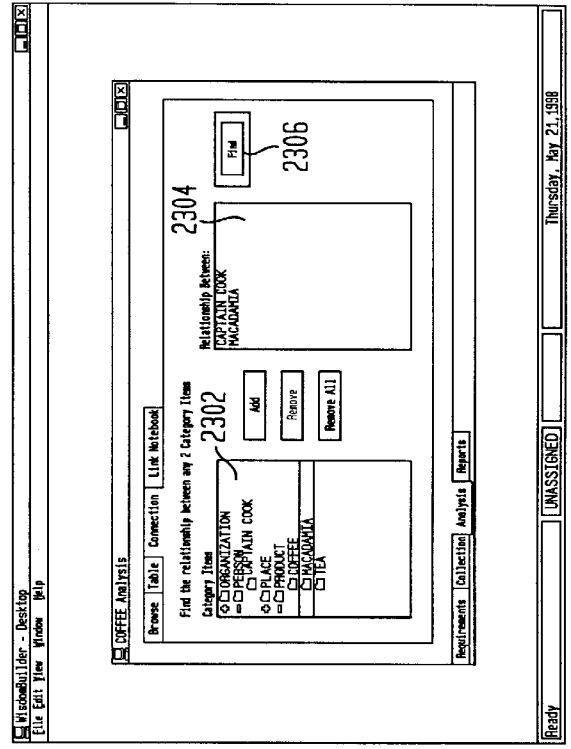

This action causes a Relationship window 2100 to be displayed, as shown in FIG. 21 This relationship window 2100 allows the user to record information about the relationship. In this example the relationship between "COFFEE" and "CAPTAIN COOK" 2110 is created. In the Relationship window 2100, the strength of the relationship 2102 and the type of relationship 2104 is recorded. In this example, the user entered the keyword "DISCOVERED" 1204 to describe the relationship between "COFFEE" and "CAPTAIN COOK". Further the word "fact" is used to describe the strength of this relationship, which for example, conveys a much stronger relationship then "speculation". In addition, any comments about the relationship can be recorded in window 2106.

Figure 22:
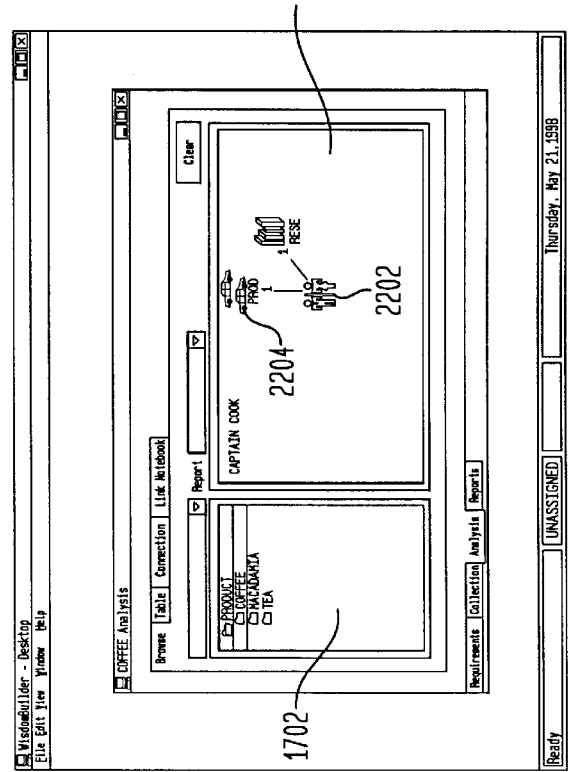

Once the relationship information is recorded in this fashion, the new relationship is displayed in the Analysis/Browse display area 1704, as shown in FIG. 22. If the relationship is associated with an item of interest from a category in which no relations were previously formed, that new category icon is displayed in the display area 1704. If there were already existing relationships between the category and the item of interest, then the count of the related items are updated. In the example shown in FIG. 22, a new relationship category, namely PRODUCT 2204 is shown as being related with the "CAPTAIN COOK" item of interest, represented by the icon 2202.

By creating a relationship between any two items, a direct relationship is created. However, after populating the repository with these direct relationships, hidden relationships begin to form. That is, more distant relationships that may not be apparent to the analyst are formed. The present invention provides the user with a means to instantly display all of the relationships that exist between items of interest.

For example, assuming a relationship is created by a user between item A and item B. Further, assume that previously, the user established relationships between items C and D, and between items B and C. Accordingly, there is now a hidden relationship, which was not explicitly formed by the user. The hidden relationships are between A and C, A and D, and B and D.

The present invention provides a mechanism that allows users to display direct and/or distant relationships between any two items of interest. In response to a user request, the system and method of the present invention displays a relationship diagram that graphically depicts the relationship between two items of interest and any relationships in-between such items. In this fashion, users are instantly presented with distant relationships that may never have been known to exist.

Figure 23:

Referring now to FIG. 23, the Analysis/Connections window is displayed. Users can request that a relationship diagram be displayed by dragging any two items of interest from the Item List 2302 into the Relationship Between list 2304. When the FIND button 2306 is pressed, a relationship diagram is displayed.

Figure 24:
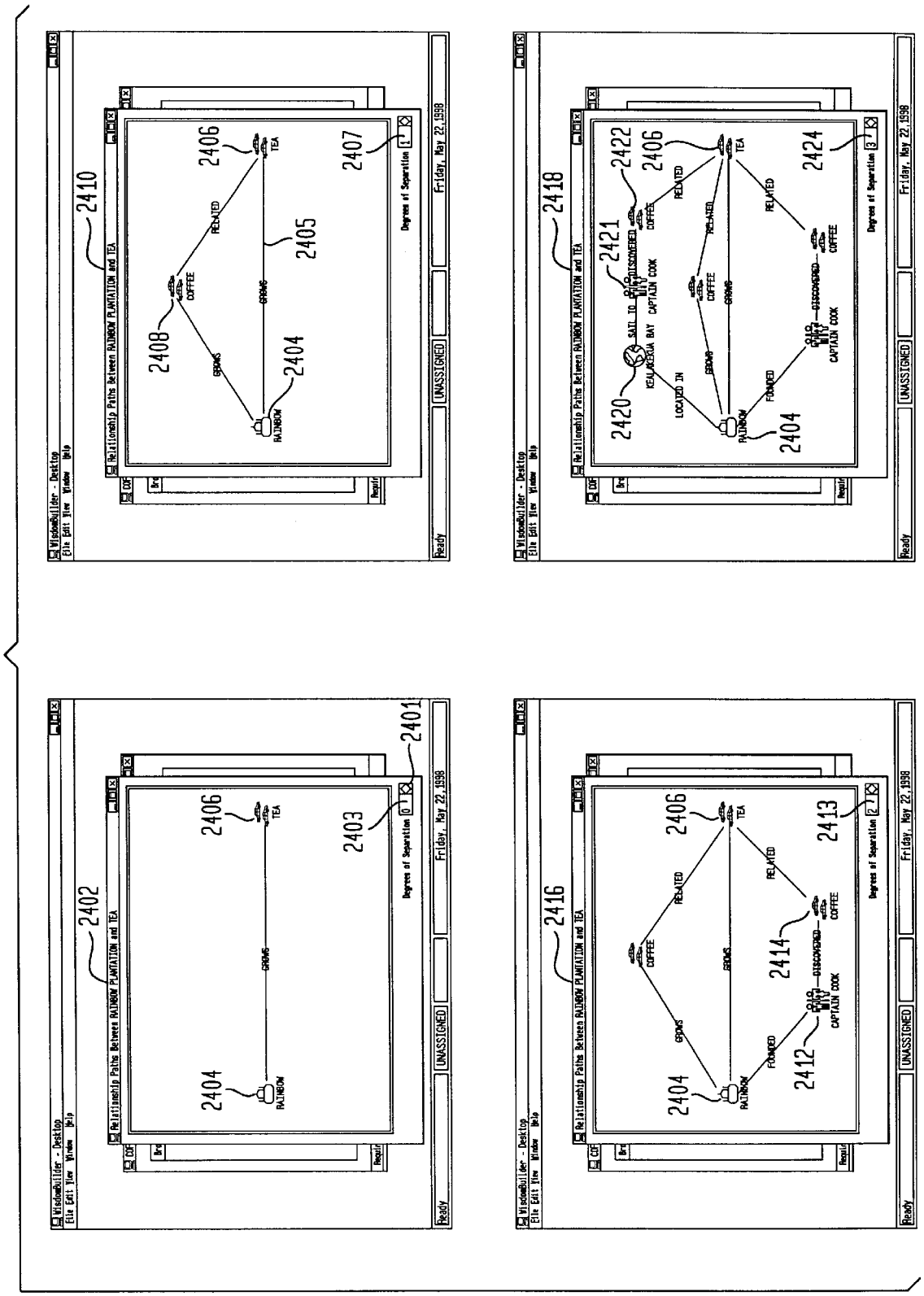

An example of a series of relationship diagrams, according to a preferred embodiment of the present invention is presented in FIG. 24. Relationship diagram 2402 depicts the relationship between two items of interest, namely: "RAINBOW PLANTATION" and "TEA." In this example, a direct relationship exists. This is referred to a relationship with a degree of separation of zero. The degree of separation is displayed in window 2403. The user can display more distant relationships by adjusting the degree of separation. This is accomplished by clicking the arrow 2401 to increase or decrease the degree of separation.

For example, by clicking on the up arrow 2401, the relationship diagram 2410 is displayed. In the relationship diagram 2410, relationships between RAINBOW 2404 and TEA 2406 with one (or less) degree of separation 2407 are depicted. Specifically, it can be seen that RAINBOW 2404 is related to COFFEE 2408 (because coffee grows at the Rainbow Plantation), and that COFFEE 2408 is related to TEA 2406. Thus, RAINBOW 2404 is not only directly related to TEA 2406, (as shown by the relationship 2405), but is also indirectly related to TEA 2406, through its relationship with COFFEE 2408.

The relationship diagram 2416 is the result of the user increasing the degrees of separation 2413 to two. Thus, in this example, the relationship between RAINBOW 2404 and TEA 2406 with two (or less) degrees of separation 2413 are depicted. In this example, a new relationship is discovered. That is, RAINBOW 2404 is related to TEA 2406, through CAPTAIN COOK 2412 and COFFEE 2414.

The relationship diagram 2418 is the result of the user increasing the degrees of separation 2424 to three. Thus, in this example, the relationship between RAINBOW 2404 and TEA 2406 with three (or less) degrees of separation 2424 are depicted. Several new relationships are depicted. Specifically, it is now known that RAINBOW 2404 is related to TEA 2406, through KEALAKEKUA BAY 2420, CAPTAIN COOK 2421 and COFFEE 2422. More distant relationships are displayed (if they exist), by clicking the arrow 2401 to increase the degree of separation.

Thus, the present invention provides a means for presenting the relationships between any two items of interest in a fast and efficient manner. Relationships that are difficult to discover, quickly emerge to the surface using the techniques provided by the present invention. The present invention accomplishes this task by performing an exhaustive search of the repository to display all of the paths between any two items of interest. A method that can be used to implement this artificial intelligence aspect of the present invention is described below.

Reports

The Dissemination phase 108 typically begins in one of two ways. The first way begins when the analysis is complete. However, for lengthy research projects, this may not be the most efficient means.

The second and preferred method for creating reports is to establish a report shell at the beginning of the Analysis Phase 106. In this fashion, items are identified and bookmarked for inclusion in the final report as they are discovered during the Analysis phase 106.

Figure 26:
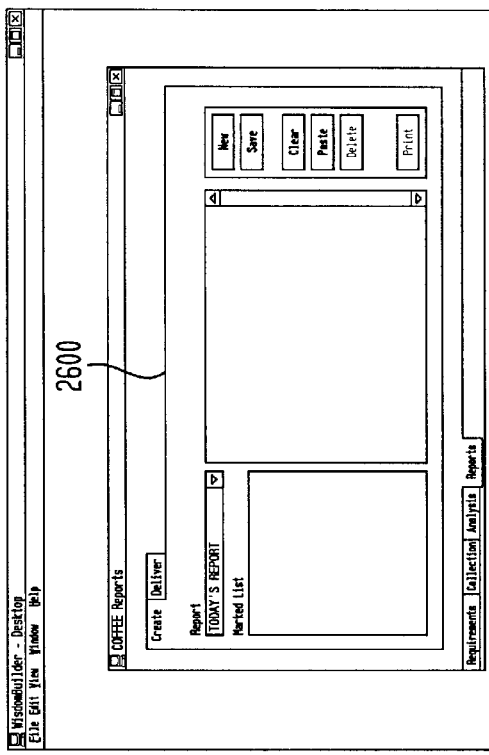
Figure 27:
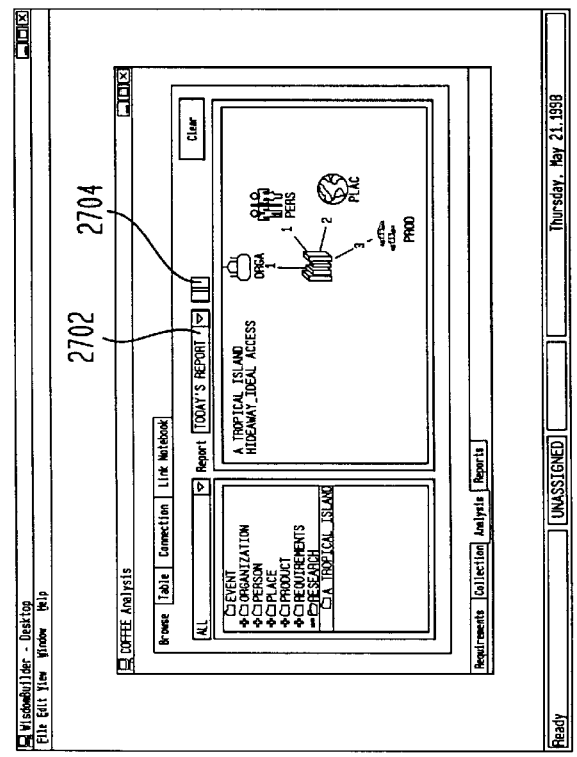

The present invention provides this capability by allowing the user to create a report during the Analysis Phase 106. This is preferably accomplished by defining a title for the report using a dialog box such as the one shown in FIG. 25. Once this is accomplished, a title screen is displayed in the Reports/Create window, as shown in FIG. 26. Note that once a report is defined in this manner, the name of the report 2702 is shown on the Analysis/Browse window as shown in FIG. 27. In addition, a bookmarking icon 2704 is displayed. Thus, when the analysts identifies an item that they would like to have included in a report, they simply drag the selected item to the bookmarking icon 2702.

Figure 28:
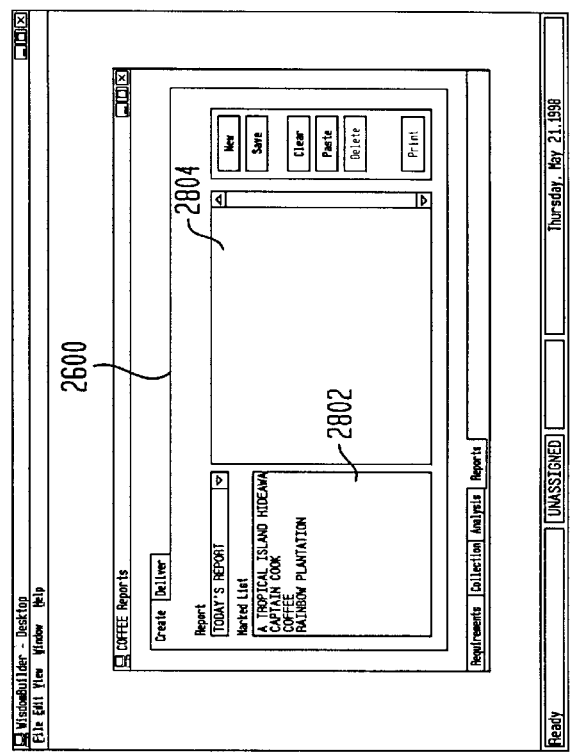
Figure 25:
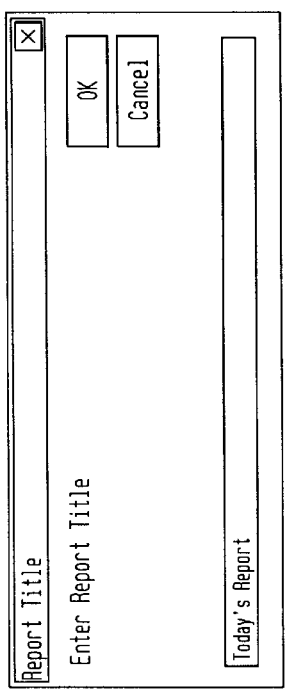

Referring now to FIG. 28, items that have been bookmarked are displayed on the Report/Create window 2600 in the Marked List 2802. These items can be used in several ways. First, if one or more items are dragged into the report area 2804, the present invention types the name of the item. For example, FIG. 29 shows the result of a user dragging the item 2904 into the report area 2804. Specifically, the name of the item 2902 is displayed in the report area 2804.

Preferably, by double-clicking on a research item, such as 2904, the original text is displayed in a text window, as shown by FIG. 30. The display in FIG. 30 allows the user to search the text for items in the Personal Dictionary or on any other string. As indicated by FIG. 30, this is accomplished by using the Find What entry box 3002 and the Find button 3004. Text from this display can also be copied and pasted directly into the report using the copy button 3006. The results of copying a section from the text window in FIG. 30, to the report window 2902, is shown in FIG. 31.

In this example embodiment, if the user double-clicks an item that is not a research item, such as CAPTAIN COOK (see 3102 in FIG. 31), comments associated with that item 3102 is displayed, as shown in FIG. 32.

Figure 33:
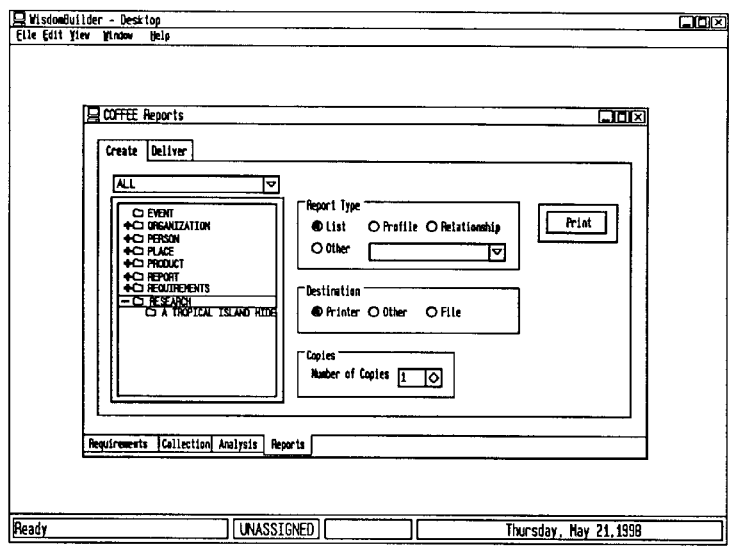

Typically, after a report is created, the analyst needs to deliver it to a decision-maker. The present invention provides tools that assist the user in formatting the report and delivering it to another user. For example, the user can select a report type that is to be used to generate the report. The report type is provided by a report template, which defines a format for the report. A typical implementation of the present invention provides many template reports that can be selected by the user. After the report type has been selected, the user selects a method in which to deliver the report. Typically, the analyst can print the report, send it via E-Mail, or save it to disk in a variety of formats. The screen in FIG. 33 shows a typical Report/Deliver screen that can be used to implement this feature of the present invention.

General Features

Figure 34:
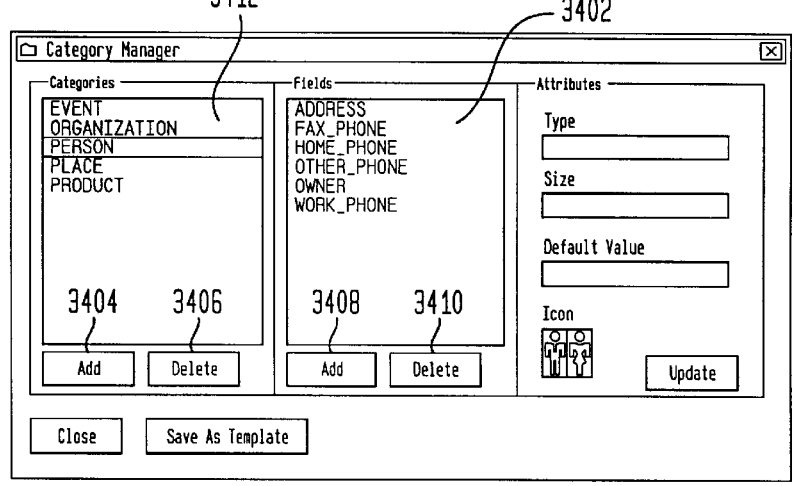
Figure 35:
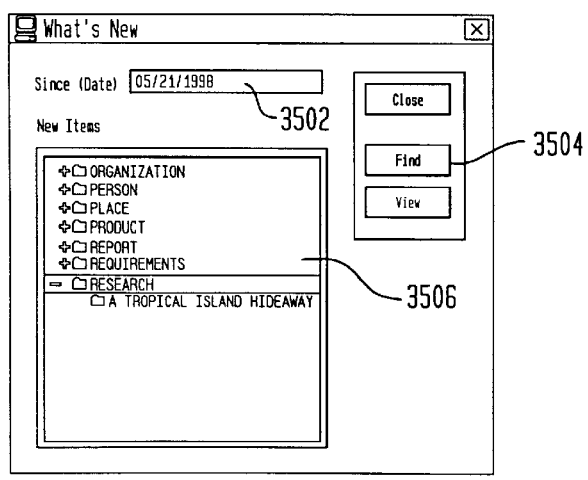

The present invention preferably provides several ways to customize and maintain the system. For example, a Category Manager is provided that allows the user to modify the requirement set structure. An example of a Category Manager window is shown in FIG. 34. This allows the user to add 3404 or delete 3406 any of the categories 3412. In addition, the user can add 3408 or delete 3410, any fields 3402 associated with the categories 3412.

Another feature of the present invention allows the user to determine what has changed in the repository from a given date. This feature is described with reference to the "What's New" screen shown if FIG. 35. In this example, the user enters a date at 3502. Once the find button 3504 is depressed, new items that were added since the date entered in 3692 are displayed in the New Items list area 3506.

Database Tables

Figure 36:
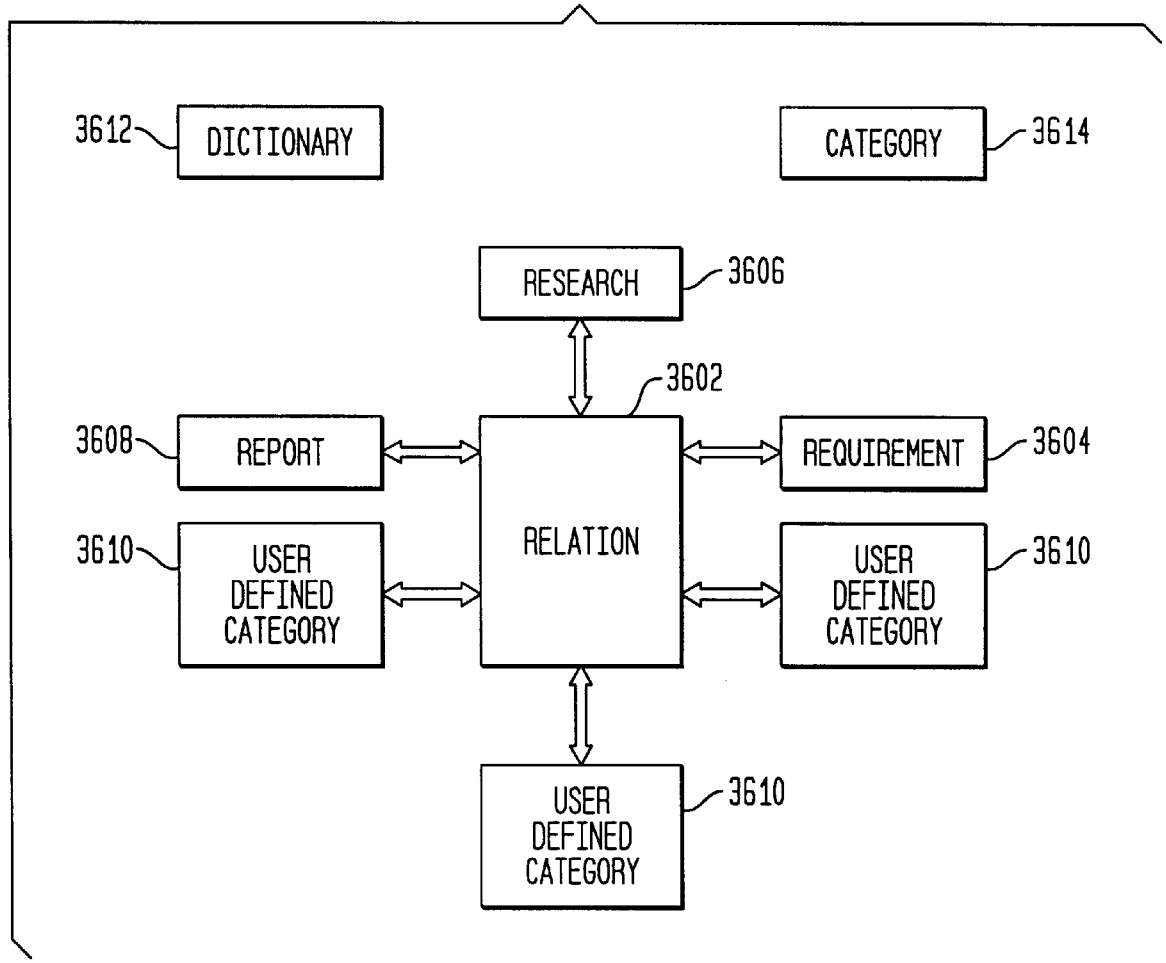
FIG. 36 is a block diagram depicting database tables that can be used in a preferred embodiment of the present invention.

FIG. 36 depicts database tables that can be used to implement the present invention. The Relation table 3602 is used to store relationships that are established between items of interest. Specifically, one entry is associated with each relationship between two items of interest. The Requirements table 3604 is used to store the requirements entered during the Requirements Phase 102.

The Report table 3608 is used to store information pertaining to the Dissemination Phase 108. The research table 3606 is used to store information pertaining to the data items saved in the repository during the Collection Phase 104. The user defined category tables 3610 are used to store information about each category defined by the user. Note that in a typical implementation, users can define their own categories or use pre-defined categories provided by a preferred embodiment of the present invention.

The dictionary table 3612 is used to store information pertaining to the Personal Dictionary. The Category table 3612 is used to store a list of valid categories defined for the current research project.

Figure 37:
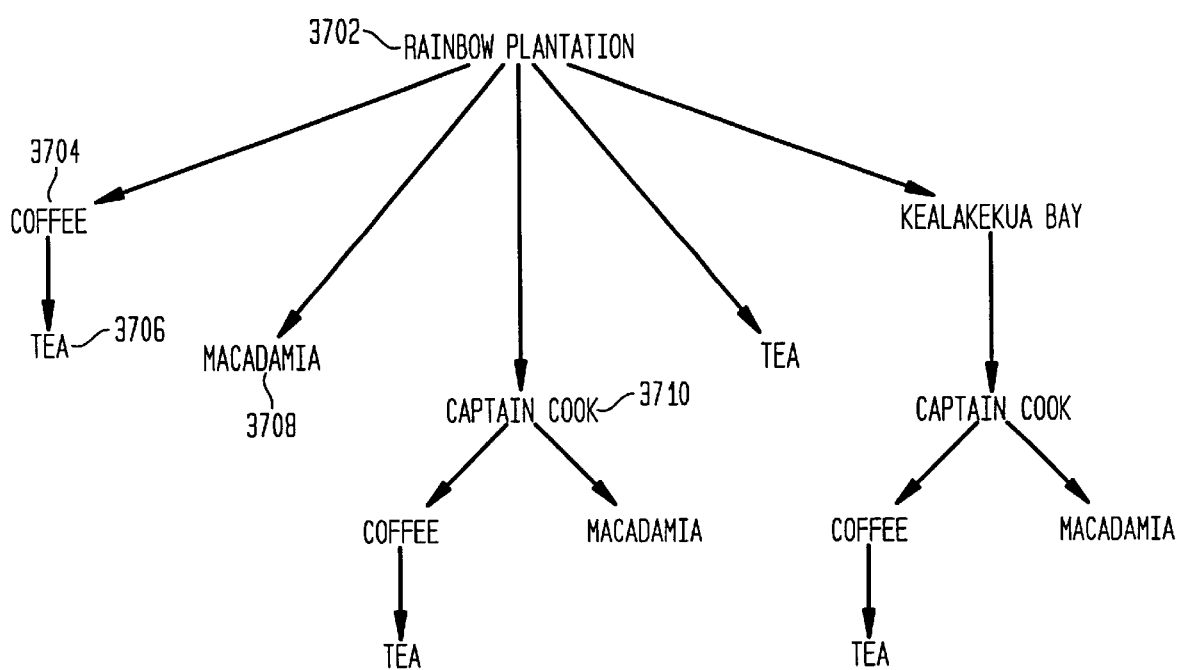
FIG. 37 is a chart that is useful for describing a method that can be used for searching the database and finding relationships between any two items of interest, according to a preferred embodiment of the present invention.

A list of fields that can be used to implement the database tables shown in FIG. 36 is presented in table 1 below. Note that the names of the fields listed below are generally descriptive of the type of information stored therein, according to a preferred embodiment of the present invention. Based on the description provided herein and the names of the fields below, the use of these fields should be apparent to persons skilled in the relevant art(s). As such, a detailed description of each of these fields is not provided herein. In addition, the fields in table 1 and the associated data tables shown in FIG. 37, represent one example of a means to implement the database management features of the present invention. Many other variations are possible and would be apparent to persons skilled in the relevant art(s).

TABLE 1

Database Tables and Fields.

| Table/Field Name | Description |
| --- | --- |
| CATEGORY 3614 | Index of valid categories |
| "NAME" | Name of user defined category |
| "TYPE" | Defines user-created versus default category |
| "ICON" | Pointer to icon file used for visual displays |
| RELATION 3602 | Stores relationships between items of interest |
| "PRI_TABLE" | Table name of first item of interest |
| "PRI_ID" | Unique ID (key) to item in table |
| "SEC_TABLE" | Table name of second item of interest |
| "SEC_ID" | Unique ID (key) to item in table |
| "ICON" | Pointer to icon file for future visual display |
| "ISA" | User defined relationship description |
| "STRENGTH" | User defined description of relationship strength |
| "DESCRIPTION" | Pointer to comments file |
| "ENTRY_DATE" | Date user defined relationship |
| "DELETE_DATE" | Future target date for record deletion |
| DICTIONARY 3612 | Stores Personal Dictionary |
| "TYPE" | Category |
| "NAME" | Name of item of interest |
| "ALIAS" | Name of alias for item of interest |
| REPORT 3608 | Stores user created reports |
| "ID" | Unique ID for report |
| "NAME" | Report Name |
| "TYPE" | Distinguishes between reports and bookmarked items |
| "ICON" | Pointer to icon file |
| "DESCRIPTION" | Pointer to comments |
| "ENTRY_DATE" | Date report created |
| "DELETE DATE" | Future deletion date |
| RESEARCH 3606 | Stores pointers to documents |
| "ID" | Unique ID for research item |
| "NAME" | User defined name |
| "ICON" | Pointer to icon file for visual displays |
| "DESCRIPTION" | User defined description |
| "ENTRY_DATE | Entry date |
| "DELETE_DATE" | Future deletion date |
| "FILETYPE" | File type of research item |
| "OWNER" | User defined owner |
| "SOURCE" | User defined |
| "ACCURACY" | User defined |
| "ORG_DATE" | Original date of research item |
| REQUIREMENTS 3604 | Stores user specified requirements |
| "NAME" | Requirement name |
| "ICON" | Pointer to icon file |
| "DESCRIPTION" | Pointer to comments file |
| "ENTRY_DATE" | Date requirement entered |
| "DELETE_DATE" | Future deletion date |
| "SORT_ORDER" | System generated sort number for displaying requirements |
| "FULL_SORT_ | System generated sort number for item and |

TABLE 1-continued

Database Tables and Fields.

| Table/Field Name | Description |
| --- | --- |
| ORDER" | ancestors |
| "LEVEL" | System generated level of the requirement |
| "REQUESTOR" | User defined |
| "OPEN_DATE" | User defined open date of the requirement |
| "CLOSE_DATE" | User defined close date for the requirement |
| "STATUS" | User defined status of the requirement |
| "PRIORITY" | User defined priority of the requirement |
| "OWNER" | User defined owner of the requirement |

Method for Searching the Database to Find all Relationships Between Two Items of Interest FIG. 37 is a chart that is useful for describing a method that can be used for searching the database and finding the paths between any two items of interest. This method can be used to implement the relationship diagrams shown in FIG. 24. It should be noted that an algorithm used to implement this feature of the present invention is preferably accomplished using a deterministic programming environment that employs automatic backtracking on failure of a precondition.

This method is preferably performed in response to user action. Specifically, this method is performed in response to a user selecting two items in which the present invention is directed to find the paths between. This can be accomplished, for example, with the screen presented in FIG. 23.

Once the two items of interest have been selected, the present invention extracts all of the records in the Relation database table 3602 and writes the information into a flat text file. The flat text file is then read into an internal database structure that is specific to the deterministic programming environment. This table can be viewed as shown in FIG. 37.

Accordingly, beginning with one of the two selected items (i.e., in this example, RAINBOW PLANTATION 3702), the method selects a related record, for example, COFFEE 3704. This relationship is compared to the second selected item, TEA 2706 and found not to match. The method then selects a related record to COFFEE 3704. In this example, the related record is TEA 3706.

Thus, the related record is compared with TEA, which results in a match. Accordingly, the path "RAINBOW PLANTATION 3702—COFFEE 3704—TEA 3706" is written to a text file.

Next, the method attempts to select another record related to COFFEE. In this example, there are no other items related to COFFEE 3704, and thus the method fails.

Accordingly, having exhausted the relationships for COFFEE 3704, the method selects the next related record for RAINBOW PLANTATION 3703. In this example, the next related record for RAINBOW PLANTATION 3703 is MACADAMIA 3708. Thus, the method continues as described above, where the method compares the relationship with the second item, namely TEA. In this case, a match is not found.

Thus, the method attempts to select another related record to MACADAMIA 3708 and fails, because there are no related records to MACADAMIA 3708 in this example.

Having exhausted the relationships for MACADAMIA 3708, the method selects the next related record for RAINBOW PLANTATION 3702. In this example the next related record is CAPTAIN COOK 3710.

Accordingly, this method continues until the entire relationship tree has been traversed and the found paths are written to a text file. At this point, control is passed back to the main method of the present invention.

The main method of the present invention then opens and reads the found paths file and creates a matrix of information for each path. This information is preferably retrieved from the Relation 3602 and the User Defined Category tables 3610. For each link in a path, a database query is created to read the Relation table 3614 an extract the "ISA" field information. The "ISA" field holds the relationship name between two items. For example, in FIG. 24, screen 2302, the relationship name between RAINBOW 2304 and TEA 2306 is "GROWS". This is the relationship name that is stored in the ISA field.

In the example, an SQL query that can be used to implement this function is: "SELECT IS A FROM RELATION WHERE PRI_ID=17 AND PRI_TABLE= 'ORGANIZATION' AND SEC_ID=38 AND SEC_TABLE='PLACE'."

Next, for each entry in the matrix, the method paints an icon representing the end nodes, writes a label for the node, paints a line connecting the nodes, and writes a label containing the ISA value. An example of this initial view for a relationship diagram 2402 is shown in FIG. 24.

Method for Implementing Interactive Data Visualization Display

A method that can be used to implement the interactive data visualization display, such as described above with reference to FIGS. 17–19, will now be described with reference to the flowchart in FIG. 38.

Figure 38:
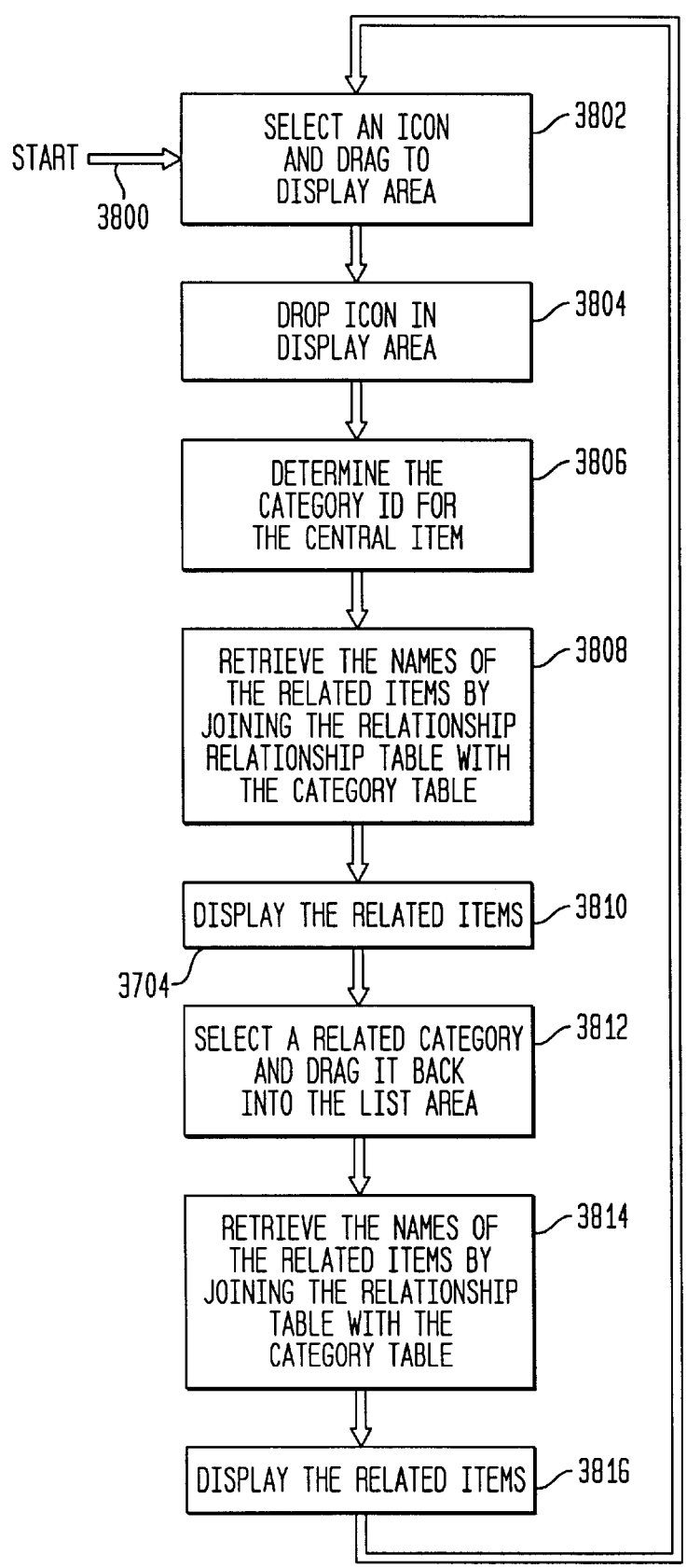
FIGS. 38–41 are flowcharts depicting methods that can be used to implement various features, according to a preferred embodiment of the present invention.

The flowchart in FIG. 38 depicts a process that can be used to implement the interactive data visualization display that is based on the movement of icons representing database records, according to a preferred embodiment of the present invention.

The process starts with step 3800, where control immediately passes to step 3802. Step 3802 represents a step where a user selects an item from the Item List box, such as the TROPICAL ISLAND item 1706 in FIG. 17. This is typically accomplished by placing the mouse pointer over the item 1706 and depressing the left mouse button. The selected item 1706 is highlighted to indicate that it is selected.

Next, control passes to step 3804 which represents the user dragging and dropping the item 1706 into the display area 1704. This is typically accomplished by holding the left mouse button down, and moving the pointer into a blank area in the display area 1704. The user then releases the left mouse button thereby dropping the icon onto the display area 1704.

Next, as indicated by step 3806, the process determines the category identification number for the item that is to appear in the center of the display 1712. Specifically, the process reads the text of the highlighted item from the Item List box 1702, and constructs a database query to read from the table of the selected item 1706. In this example, a database query is directed to the Research table 3606, because the selected item 1702 is a research item.

For example, an SQL query that can be used is as follows: "SELECT ID FROM RESEARCH WHERE NAME='A TROPICAL ISLAND'." Thus, the database query is executed and 'ID' of the selected item 1706 is returned. Typically this is then saved in a global variable, such as CENTER_ID.

Next, control passes to step 3808. In step 3808, the process retrieves the names of the related items by joining the Relation table 3602 with the User Defined Category tables 3610. Specifically, using the retrieved ID from step

3806, two additional SQL queries are constructed for each user defined category listed in the Category table 3614 to read from the Relation table 3602.

An example of such an SQL query is: "SELECT DISTINCT SEC_ID FROM RELATION WHERE PRI_TABLE='RESEARCH' AND PRI_ID=ID AND SEC_TABLE='ORGANIZATION' and SELECT DISTINCT PRI_ID FROM RELATION WHERE SEC_TABLE='RESEARCH' AND SEC_ID=ID AND PRI_TABLE='ORGANIZATION'." This query results in retrieving a count of the relationships for the selected item 1706 organized by category 1714–1720.

Next, control passes to step 3810, where the visual representation 1710 is displayed. For each category with a count greater than 0, the icon representing the category (such as 1714–1720) is displayed, along with the count and the connecting lines.

Step 3812 represents an action by the user, wherein the user selects one of the displayed category icons (1714–1720). This is typically accomplished by pointing the mouse to the category icon and depressing the left mouse button. In this example, the Product icon 1720 is selected. Next, the user drags the icon representing the Product category, back to the Item List box 1702.

When this occurs, control passes to step 3814. In step 3814, the process retrieves the names of the related items by joining the Relation table 3602 with the User Defined Category tables 3610.

This step can be implemented as follows. Using the CENTER_ID global variable as described above, and the category name, another database query is constructed. The database query is designed to retrieve all the related items from the Relation table 3607, organized in alphabetical order. For example, an SQL query that can be used in the example embodiment is as follows: "SELECT PRODUCT.NAME FROM INNER JOIN ON RELATION.SEC_ID=PRODUCT.ID WHERE RELATION.PRI_TABLE='RESEARCH' AND RELATION.PRI_ID=CENTER_ID AND RELATION.SEC_TABLE='PRODUCT' SQLQ=SQLQ UNION ALL SELECT PRODUCT.NAME FROM PRODUCT INNER JOIN RELATION ON RELATION.PRI_ID=PRODUCT.ID WHERE RELATION.SEC_TABLE='RESEARCH' AND RELATION.SEC_ID=CENTER_ID AND RELATION.PRI_TABLE='PRODUCT' ORDER BY NAME."

The list of retrieved names is then displayed in the Item List area 1706, as indicated by step 3816. As indicated by the flowchart in FIG. 38, the process can repeat itself, depending on user action.

Method for Modeling Document Contents

Figure 39:
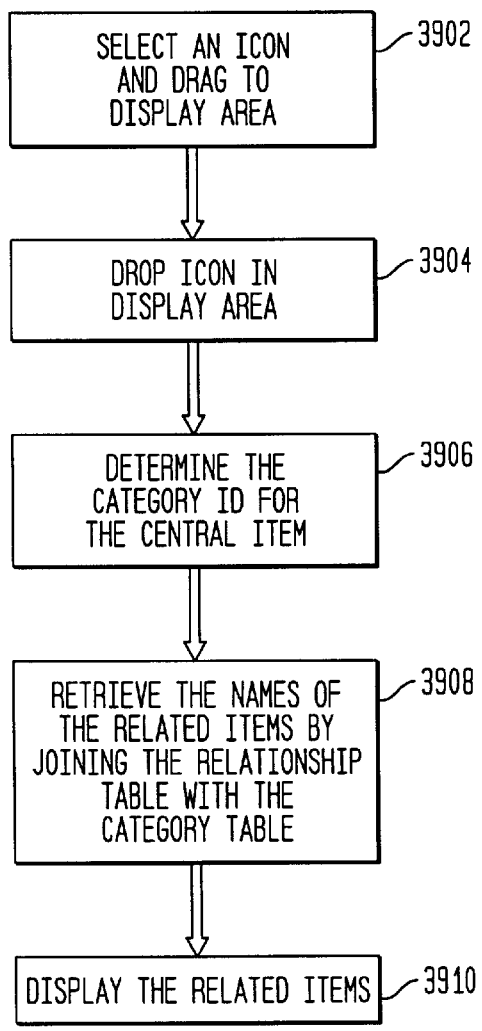

FIG. 39 is a flowchart depicting a process that can be used to implement a visual representation for modeling document contents, according to a preferred embodiment of the present invention. It is noted that this method is similar to the first 5 steps (3802–3810) of the method presented in FIG. 38.

The process begins with 3902. Step 3902 represents a step where a user selects an item from the Item List box, such as the TROPICAL ISLAND item 1706 in FIG. 17. This is typically accomplished by placing the mouse pointer over the item 1706 and depressing the left mouse button. The selected item 1706 is highlighted indicating that is selected.

Next, control passes to step 3904 which represents the user dragging and dropping the item 1706 into the display area 1704. This is typically accomplished by holding the left mouse button down, and moving the pointer into a blank area in the display area 1704. The user then releases the left mouse button thereby dropping the icon onto the display area 1704.

Next, as indicated by step 3906 the process determines the category identification number for the item that is to appear in the center of the display 1712. Specifically, the process reads the text of the highlighted item from the Item List box 1702 and constructs a database query to read from the table of the selected item 1706. In this example, a database query is directed to the Research table 3606, because the selected item 1702 is a research item.

For example, an SQL query that can be used is as follows: "SELECT ID FROM RESEARCH WHERE NAME='A TROPICAL ISLAND'." Thus, the database query is executed and 'ID' of the selected item 1706 is returned. Typically this is then saved in a global variable, such as CENTER_ID.

Next, control passes to step 3908. In step 3908, the process retrieves the names of the related items by joining the Relation table 3602 with the User defined Category tables 3610. Specifically, using the retrieved ID from step 3906, two additional SQL queries are constructed for each category in the Category table 3614 to read from the Relation table 3602. An example of such an SQL query is: "SELECT DISTINCT SEC_ID FROM RELATION WHERE PRI_TABLE='RESEARCH' AND PRI_ID=ID AND SEC_TABLE='ORGANIZATION' and SELECT DISTINCT PRI_ID FROM RELATION WHERE SEC_TABLE='RESEARCH' AND SEC_ID=ID AND PRI_TABLE='ORGANIZATION'." This query results in retrieving a count of the relationships for the selected item 1706 organized by category 1714–1720.

Next, control passes to step 3910, where the visual representation 1710 is displayed. For each category with a count greater than 0, the icon representing the category (such as 1714–1720) is displayed, along with the count and the connecting lines. The process then ends as indicated by FIG. 39.

Method for Extracting Items of Interest from Documents

Figure 40:
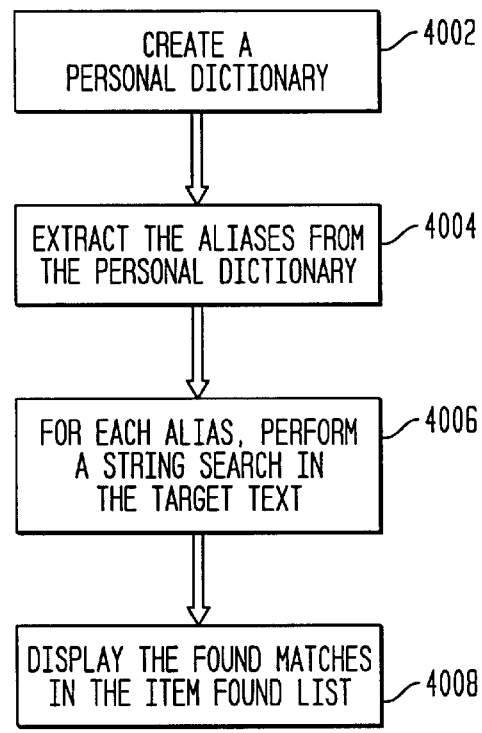

FIG. 40 is a flowchart depicting a process that can be used for locating and identifying items of interest in documents based on a list of items of interest. The items of interest include aliases for each item as described above. The method performs a search through the document and locates and displays occurrences of the found items and any aliases.

As indicated by step 4002, this process begins with the creation of a personal dictionary, as described above. In a preferred embodiment, the dictionary allows the user to enter aliases in addition to the proper name. Next control passes to step 4004.

In step 4004, the process extracts all of the aliases from the dictionary in response to a user request. This is typically implemented by the user clicking the SCAN button 1502 as shown in FIG. 15. The method extracts all of the aliases from the dictionary by for example, performing an SQL query as follows: "SELECT*FROM DICTIONARY ORDER BY NAME."

Next, as step 4006 indicates, for each alias (including the proper name of the item), a string search is performed in the target text. Accordingly, for each word in the extracted list from step 4004, a string match is performed. If a match is found, the alias that was found is temporarily stored in an internal variable list.

Next control passes to step 4008. In step 4008 the method displays the found matches in the item found list 1504. The process then ends as indicated by FIG. 40.

Method Marking Database Items for Inclusion into Reports

Figure 41:
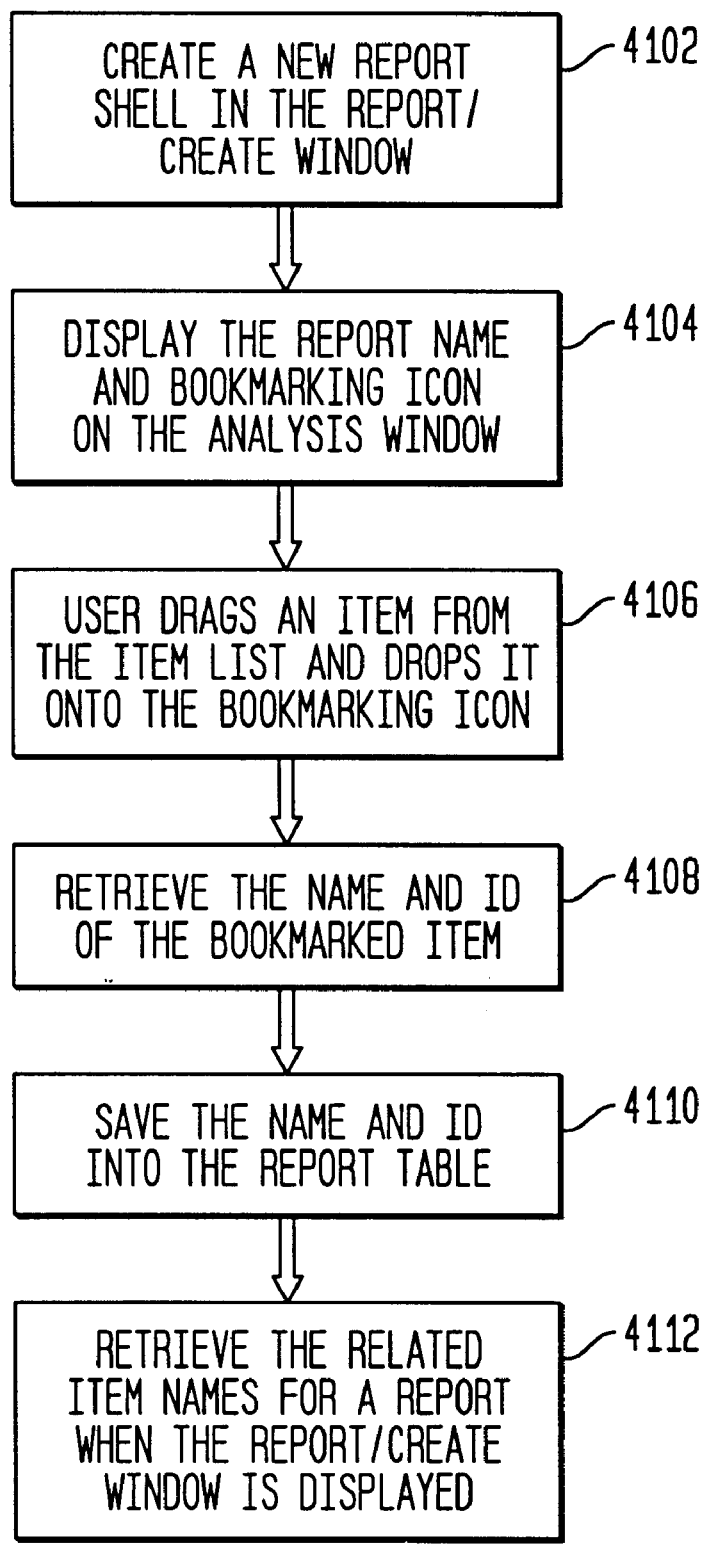

FIG. 41 is a flowchart depicting a process that can be used for marking database items used for reporting purposes. This process is launched by the user moving icons representing database items to a special marking icon, as described above.

The process begins with step 4102 where the user creates a new report shell in the Report/Create window shown in FIG. 28. This creates a record in the Reports table 3608. An example of a command that can be used to create such a record is: "ADDNEW TO REPORT WHERE NAME='report_name'."

Next, as step 4104 indicates, this also causes a BOOK-MARKING icon to be displayed on the Analysis/Browse window, such as 2704 in FIG. 27. Next control passes to step 4106.

Step 4106 represents a step where the user selects an item for book-marking from the Item List box, such as 2904 in FIG. 29. The selected item 2904 is highlighted indicating its selection. The user then drags the selected item 2904 into the report area 2804.

In response to this user action, step 4108 is processed. In step 4108, the process reads the text of the highlighted item 2904 for the Item List box and constructs an database query to read from the selected items' table. In this case the table in the Research table 3606. An example of an SQL query that can be used is: "SELECT ID FROM RESEARCH WHERE NAME='A TROPICAL ISLAND HIDEAWAY'." The read is executed and the selected items' ID is returned.

Next, as step 4110 indicates, the name and ID is saved in the Report table 3608. For example, using the retrieved ID from step 4108, an SQL insert query is constructed to write the item ID and the report name into the REPORT table 3608. An example of an SQL insert query that can be used to implement this step is: "ADDNEW TO REPORT WHERE NAME='TODAYS REPORT' AND OBJECT='A TROPICAL ISLAND HIDEAWAY_IDEAL ACCESS' AND TYPE=2."

Next, control passes to step 4112. In step 4112 the process retrieves the related item names for a report when the Report/Create window is displayed. FIG. 28 shows an example of a Marked List 2802 that is displayed as a result of this step. In response to a request by a user to view the Report/Create window shown in FIG. 28, the process creates a database query to generate the list in 2802. An example of an SQL database query that can be used to implement this step is: "SELECT DISTINCT OBJECT FROM REPORT WHERE NAME='TODAYS REPORT' AND TYPE='2' ORDER BY OBJECT." This query retrieves all the related items as a result of Bookmarking, that are to be read from the Report table 3608 and displayed in the Marked list box 2802. The process then ends as indicated by FIG. 41.

The present invention may be implemented using hardware, software or a combination thereof and may be implemented in a computer system or other processing system. In fact, in one embodiment, the invention is directed toward a computer system capable of carrying out the functionality described herein. An example computer system 4201 is shown in FIG. 42. The computer system 4201 includes one or more processors, such as processor 4204. The processor 4204 is connected to a communication bus 4202. Various software embodiments are described in terms of this example computer system. After reading this description, it will become apparent to a person skilled in the relevant art how to implement the invention using other computer systems and/or computer architectures.

Computer system 4202 also includes a main memory 4206, preferably random access memory (RAM), and can also include a secondary memory 4208. The secondary memory 4208 can include, for example, a hard disk drive 4210 and/or a removable storage drive 1012, representing a floppy disk drive, a magnetic tape drive, an optical disk drive, etc. The removable storage drive 4212 reads from and/or writes to a removable storage unit 4214 in a well known manner. Removable storage unit 4214, represents a floppy disk, magnetic tape, optical disk, etc. which is read by and written to by removable storage drive 4212. As will be appreciated, the removable storage unit 4214 includes a computer usable storage medium having stored therein computer software and/or data.

In alternative embodiments, secondary memory 4208 may include other similar means for allowing computer programs or other instructions to be loaded into computer system 4201. Such means can include, for example, a removable storage unit 4222 and an interface 4220. Examples of such can include a program cartridge and cartridge interface (such as that found in video game devices), a removable memory chip (such as an EPROM, or PROM) and associated socket, and other removable storage units 4222 and interfaces 4220 which allow software and data to be transferred from the removable storage unit 4222 to computer system 4201.

Computer system 4201 can also include a communications interface 4224. Communications interface 4224 allows software and data to be transferred between computer system 4201 and external devices. Examples of communications interface 4224 can include a modem, a network interface (such as an Ethernet card), a communications port, a PCMCIA slot and card, etc. Software and data transferred via communications interface 4224 are in the form of signals which can be electronic, electromagnetic, optical or other signals capable of being received by communications interface 4224. These signals 4226 are provided to communications interface via a channel 4228. This channel 4228 carries signals 4226 and can be implemented using wire or cable, fiber optics, a phone line, a cellular phone link, an RF link and other communications channels.

In this document, the terms "computer program medium" and "computer usable medium" are used to generally refer to media such as removable storage device 4212, a hard disk installed in hard disk drive 4210, and signals 4226. These computer program products are means for providing software to computer system 4201.

Computer programs (also called computer control logic) are stored in main memory and/or secondary memory 4208. Computer programs can also be received via communications interface 4224. Such computer programs, when executed, enable the computer system 4201 to perform the features of the present invention as discussed herein. In particular, the computer programs, when executed, enable the processor 4204 to perform the features of the present invention. Accordingly, such computer programs represent controllers of the computer system 4201.

In an embodiment where the invention is implemented using software, the software may be stored in a computer program product and loaded into computer system 4201 using removable storage drive 4212, hard drive 4210 or communications interface 4224. The control logic (software), when executed by the processor 4204, causes the processor 4204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for automating collection, management and analysis of data, comprising:

means for storing documents and related information;
   means for compiling a plurality of documents;
   means for displaying said documents to a user;
   means for creating a personal dictionary, wherein a user defines one or more categories, each comprising one or more items of interest;
   means for analyzing a first document, including:
      means for searching said first document for one or more of said items of interest, and
      means for saving said first document and a list of said items of interest contained therein; and
   means for displaying a visual representation depicting the contents of said first document, wherein said visual representation includes a document icon representing said first document, and one or more category icons each representing a category that includes at least one of said items of interest in said list.

2. The system of claim 1, further including means, connected to said means for analyzing, for generating a report.

3. The system of claim 2, further comprising means for bookmarking said documents for use by said means for generating a report.

4. The system of claim 1, wherein said means for displaying displays a representation of the number of items of interest contained in said first document that are within each category represented by one of said category icons, whereby said visual representation is used to rank the relevancy of said document.

5. The system of claim 1, wherein said personal dictionary includes aliases for one or more of said items of interest, wherein said aliases are used by said means for searching.

6. The system of claim 1, further comprising means for sharing said personal dictionary.

7. The system of claim 1, wherein said means for collecting documents includes accessing an external source to compile said documents.

8. The system of claim 1, wherein said first document is automatically associated with written comments provided by said user.

9. The system of claim 1, further comprising a scanner for entering said first document.

10. The system of claim 1, further comprising means for dragging one of said plurality of icons to an item list area.

11. The system of claim 1, wherein each said category icon includes a numerical representation depicting the number of said items of interest within each said category represented by said category icon.

12. The system of claim 1, further comprising means for creating relationship links between said items of interest.

13. The system of claim 1, further comprising means for displaying all relationships between said items of interest.

14. A system for displaying a representation of a document having one or more items of interest contained therein, said system comprising:

means for defining one or more categories by a user, wherein each category comprises one or more of the items of interest defined by said user;
   means for displaying a first visual representation depicting the contents of the document within a first window, wherein said visual representation includes a document icon representing the document and one or more category icons representing one or more of said categories that includes at least one of said items of interest, wherein said at least one of said items of interest associated with said category icon is contained in said first document.

15. The system of claim 14, further comprising a database that stores information about the document and means for interacting with said visual representation for navigating said database for gaining knowledge about the relevancy of the document and relationships between the document and other information stored in said database.

16. The system of claim 15, wherein said means for interacting with said first visual representation includes interacting with one of said category icons to display a list of said items of interest within said category represented by said one of said category icons.

17. The system of claim 16, wherein said means for interacting includes dragging said one of said category icons to a second window.

18. The system of claim 16, further including means for interacting with a selected items of interest from said list, and means for displaying a second visual representation of said selected item of interest, wherein said second visual representation includes an item icon representing said selected item of interest, and a research icon representing the number of documents that include said selected item of interest.

19. The method of claim 14, further comprising means for collecting at least one document to be analyzed prior to displaying said first visual representation.

20. The method of claim 19, further comprising means for analyzing said at least one document to determine whether it includes said one or more items of interest.

21. A system for displaying a visual representation depicting relationships between objects stored in a database, said system comprising:

a database having a plurality of records, wherein each said record represents a relationship between two objects;
   means for selecting two objects for determining the relationships therebetween;
   means, connected to said database, for determining relationships between said two objects, wherein said relationships include direct and indirect relationships; and
   means for displaying the visual representation, wherein the visual representation is adjustable by a user according to a desired degree of separation between said two objects.

22. The system of claim 21, wherein the visual representation includes a plurality of icons, each icon representing an object, and said icons are joined by connecting lines for depicting said relationships.

23. A method for automating management and analysis of data, the method comprising the steps of:

compiling and storing a plurality of documents;
   creating a personal dictionary by defining one or more categories and defining one or more items of interest within each of said categories;
   analyzing a first document, comprising the steps of:
      searching said first document for one or more of said items of interest, and
      if said first document contains said one or more items of interest, saving said first document and a list of said items of interest contained therein; and
   displaying a visual representation depicting the contents of said first document, wherein said visual representation includes a document icon representing said first document, and one or more category icons each representing a category that includes at least one of said items of interest in said list.

24. A method for displaying a representation of a document having one or more items of interest contained therein, said method comprising the steps of:
   defining one or more categories by a user, wherein each category comprises one or more items of interest defined by said user;
   displaying a first visual representation depicting the contents of the document within a first window, wherein said visual representation includes a document icon representing the document and one or more category icons representing one or more of said categories that includes at least one of said items of interest, wherein said at least one of said items of interest associated with said category icon is contained in the document.

25. The method of claim 24, further comprising the step of:
   navigating a database that stores information about the document by interacting with said visual representation to gain knowledge about the relevancy of the document and relationships between the document and other information stored in said database.

26. The method of 25, wherein said step of navigating includes the step of interacting with one of said category icons to display a list of said items of interest within said category represented by said one of said category icons.

27. The method of claim 26, wherein said step of interacting is performed by a user dragging said one of said category icons to a second window.

28. The method of claim 25, further comprising the steps of interacting with a selected item of interest, and
   displaying a second visual representation of said selected item, wherein said second visual representation includes an item icon representing said selected item, and a research icon representing the number of documents that include said selected item.

29. The method of claim 24, further comprising collecting at least one document to be analyzed prior to displaying said first visual representation.

30. The method of claim 29, further comprising analyzing said at least one document to determine whether it includes said one or more items of interest.

31. A method for displaying a visual representation depicting relationships between objects stored in a database, said method comprising the steps of:
   creating a database having a plurality of records, wherein each said record represents a relationship between two objects;
   selecting two objects for determining the relationships therebetween;
   determining relationships between said two objects, wherein said relationships include direct and indirect relationships; and
   displaying the visual representation, wherein the visual representation is adjustable by a user according to a desired degree of separation between said two objects.

32. The method of claim 31, wherein the visual representation includes a plurality of icons, each icon representing an object, and said icons are joined by connecting lines for depicting said relationships.

33. A computer program product comprising a computer useable medium having computer program logic stored therein, said computer program logic for enabling a computer to automate management and analysis of data, wherein said computer program logic comprises:
   means for enabling the computer to store documents and related information;
   means for enabling the computer to compile a plurality of documents in said storing means;
   means for enabling the computer to display said documents to a user;
   means for enabling the computer to create a personal dictionary, wherein a user defines one or more categories, each comprising one or more items of interest;
   means for enabling the computer to analyze a first document, including:
      means for enabling the computer to search said first document for one or more of said items of interest, and
      if said first document contains said one or more items of interest, means for enabling the computer to save said first document and a list of said items of interest contained therein; and
   means for enabling the computer to display a visual representation depicting the contents of said first document, wherein said visual representation includes a document icon representing said first document, and one or more category icons each representing a category that includes at least one of said items of interest in said list.

34. The computer program product of claim system of claim 33, wherein said means for enabling the computer to display displays a representation of the number of items of interest contained in said first document that are within each category represented by one of said category icons, whereby said visual representation is used to rank the relevancy of said first document.

35. The computer program product of claim 33, wherein said means for enabling the computer to compile documents includes means for enabling the computer to access internal and external databases.

36. The computer program product of claim 33, further comprising means for enabling the computer to allow a user to drag one of said plurality of icons to an item list area.

37. A computer program product comprising a computer useable medium having computer program logic stored therein, said computer program logic for enabling a computer to display a representation of a document having one or more items of interest contained therein, wherein said computer program logic comprises:
   means for enabling the computer to accept from a user, a specification for one or more categories and one or more items of interest within each of said categories;
   means for enabling the computer to display a first visual representation depicting the contents of the document within a first window, wherein said visual representation includes a document icon representing the document and one or more category icons representing one or more of said categories that includes at least one of said items of interest, wherein said at least one of said items of interest associated with said category icon is contained the first document.

38. The computer program product of claim 37, further comprising a means for enabling the computer to create a database for storing information about the document; and
   means for enabling the computer to allow a user to interact with said visual representation for navigating said database for providing knowledge about the relevancy of the document and relationships between the document and other information stored in said database.

39. The computer program product of claim 38, wherein said means for enabling the computer to allow a user to interact with said first visual representation includes means for enabling the computer to allow a user to interact with one of said category icons to display a list of said items of interest within said category represented by said one of said category icons.

40. The computer program product of claim 39, wherein said means for enabling the computer to allow a user to interact further includes means for enabling the computer to allow a user to drag said one of said category icons to a second window.

41. The computer program product of claim 39, further including means for enabling the computer to allow a user to interact with a selected item of interest from said list; and means for enabling the computer to display a second visual representation of said selected item, wherein said second visual representation includes an item icon representing said selected item, and a research icon representing the number of documents that include said selected item.

42. The method of claim 37, further comprising means for enabling the computer to collect at least one document to be analyzed prior to displaying said first visual representation.

43. The method of claim 42, further comprising means for enabling the computer to analyze said at least one document to determine whether it includes said one or more items of interest.

44. A computer program product comprising a computer useable medium having computer program logic stored therein, said computer program logic for enabling a computer to display a visual representation depicting relationships between objects stored in a database, wherein said computer program logic comprises:

means for enabling the computer to maintain database having a plurality of records, wherein each said record represents a relationship between two objects;

means for enabling the computer to allow a user to select two objects for determining the relationships therebetween;

means for enabling the computer to determine relationships between said two objects, wherein said relationships include direct and indirect relationships; and means for enabling the computer to display the visual representation, wherein the visual representation is adjustable by a user according to a desired degree of separation between said two objects.

45. The computer program product of claim 44, wherein the visual representation includes a plurality of icons, each icon representing an object, and said icons are joined by connecting lines for depicting said relationships.

* * * * *